US 12,449,822 B2

(12) United States Patent
Komoroski et al.

(10) Patent No.: US 12,449,822 B2
(45) Date of Patent: Oct. 21, 2025

(54) GROUND CLUTTER AVOIDANCE FOR A MOBILE ROBOT

(71) Applicant: Boston Dynamics, Inc., Waltham, MA (US)

(72) Inventors: Adam Komoroski, Westwood, MA (US); Brian Yamauchi, Boston, MA (US); Matthew Klingensmith, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 209 days.

(21) Appl. No.: 18/337,933

(22) Filed: Jun. 20, 2023

(65) Prior Publication Data

US 2023/0418297 A1     Dec. 28, 2023

Related U.S. Application Data

(60) Provisional application No. 63/354,763, filed on Jun. 23, 2022.

(51) Int. Cl.
*G05D 1/622* (2024.01)
*B62D 57/032* (2006.01)
(Continued)

(52) U.S. Cl.
CPC .......... *G05D 1/622* (2024.01); *B62D 57/032* (2013.01); *G05D 1/0214* (2013.01);
(Continued)

(58) Field of Classification Search
CPC ...... B62D 57/02; B62D 57/032; G05D 1/622; G05D 1/0214; G05D 1/0238;
(Continued)

(56) References Cited

U.S. PATENT DOCUMENTS 5,111,401 A     5/1992  Everett et al.
5,378,969 A     1/1995  Haikawa
(Continued)

FOREIGN PATENT DOCUMENTS

CA        2928262        7/2012
CN     102037317 A       4/2011
(Continued)

OTHER PUBLICATIONS

Boston Dynamics, "Hey Buddy, Can You Give Me A Hand?," https://www.youtube.com/watch?v=fUyU3IKzoio, Feb. 12, 2018, downloaded Jul. 31, 2023.
(Continued)

*Primary Examiner* — Christian Chace
*Assistant Examiner* — Nicholas Stryker
(74) *Attorney, Agent, or Firm* — Knobbe, Martens, Olson & Bear, LLP

(57) ABSTRACT

Methods and apparatus for navigating a robot along a route through an environment, the route being associated with a mission, are provided. The method comprises identifying, based on sensor data received by one or more sensors of the robot, a set of potential obstacles in the environment, determining, based at least in part on stored data indicating a set of footfall locations of the robot during a previous execution of the mission, that at least one of the potential obstacles in the set is an obstacle, and navigating the robot to avoid stepping on the obstacle.

25 Claims, 16 Drawing Sheets

(51) Int. Cl.
   *G05D 1/00*      (2024.01)
   *G05D 1/43*      (2024.01)
   *G05D 1/617*     (2024.01)
   *G05D 1/628*     (2024.01)
   *G06T 7/10*      (2017.01)

(52) U.S. Cl.
   CPC ......... *G05D 1/0238* (2013.01); *G05D 1/0274* (2013.01); *G05D 1/43* (2024.01); *G05D 1/617* (2024.01); *G05D 1/628* (2024.01); *G06T 7/10* (2017.01); *G06T 2207/10028* (2013.01); *G06T 2207/30261* (2013.01)

(58) Field of Classification Search
   CPC ...... G05D 1/0274; G05D 1/617; G05D 1/628; G06T 2207/30261
   See application file for complete search history.

(56) References Cited

U.S. PATENT DOCUMENTS

| | | |
|---|---|---|
| 7,211,980 B1 | 5/2007 | Bruemmer et al. |
| 7,865,267 B2 | 1/2011 | Sabe et al. |
| 7,912,583 B2 | 3/2011 | Gutmann et al. |
| 8,270,730 B2 | 9/2012 | Watson |
| 8,346,391 B1 | 1/2013 | Anhalt et al. |
| 8,548,734 B2 | 10/2013 | Barbeau et al. |
| 8,849,494 B1 | 9/2014 | Herbach et al. |
| 8,930,058 B1 | 1/2015 | Quist et al. |
| 9,352,470 B1 | 5/2016 | da Silva et al. |
| 9,561,592 B1 | 2/2017 | Silva et al. |
| 9,574,883 B2 | 2/2017 | Watts et al. |
| 9,586,316 B1 | 3/2017 | Swilling |
| 9,594,377 B1 | 3/2017 | Perkins et al. |
| 9,717,387 B1 | 8/2017 | Szatmary et al. |
| 9,844,879 B1 | 12/2017 | Cousins et al. |
| 9,896,091 B1 | 2/2018 | Kurt et al. |
| 9,908,240 B1 | 3/2018 | da Silva et al. |
| 9,910,441 B2 | 3/2018 | Levinson et al. |
| 9,933,781 B1 | 4/2018 | Bando et al. |
| 9,969,086 B1 | 5/2018 | Whitman |
| 9,975,245 B1 | 5/2018 | Whitman |
| 10,081,098 B1 | 9/2018 | Nelson et al. |
| 10,081,104 B1 | 9/2018 | Swilling |
| 10,226,870 B1 | 3/2019 | Silva et al. |
| 11,175,664 B1 | 11/2021 | Boyraz |
| 11,268,816 B2 | 3/2022 | Fay et al. |
| 11,287,826 B2 | 3/2022 | Whitman et al. |
| 11,480,974 B2 | 10/2022 | Lee et al. |
| 11,518,029 B2 | 12/2022 | Cantor et al. |
| 11,656,630 B2 | 5/2023 | Jonak et al. |
| 11,747,825 B2 | 9/2023 | Jonak et al. |
| 11,774,247 B2 | 10/2023 | Fay et al. |
| 12,222,723 B2 | 2/2025 | Yamauchi |
| 2005/131581 A1 | 6/2005 | Sabe et al. |
| 2006/0009876 A1 | 1/2006 | McNeil |
| 2006/0025888 A1 | 2/2006 | Gutmann et al. |
| 2006/0167621 A1 | 7/2006 | Dale |
| 2007/0233338 A1 | 10/2007 | Ariyur et al. |
| 2007/0282564 A1 | 12/2007 | Sprague et al. |
| 2008/0009966 A1 | 1/2008 | Bruemmer et al. |
| 2008/0027590 A1 | 1/2008 | Phillips et al. |
| 2008/0086241 A1 | 4/2008 | Phillips et al. |
| 2009/0125225 A1 | 5/2009 | Hussain et al. |
| 2010/0066587 A1 | 3/2010 | Yamauchi et al. |
| 2010/0172571 A1 | 7/2010 | Yoon et al. |
| 2011/0035087 A1 | 2/2011 | Kim et al. |
| 2011/0172850 A1 | 7/2011 | Paz-Meidan et al. |
| 2011/0224901 A1 | 9/2011 | Aben et al. |
| 2012/0089295 A1 | 4/2012 | Ahn et al. |
| 2012/0182392 A1 | 7/2012 | Kearns et al. |
| 2013/0141247 A1 | 6/2013 | Ricci |
| 2013/0231779 A1 | 9/2013 | Purkayastha et al. |
| 2013/0325244 A1 | 12/2013 | Wang et al. |
| 2014/0188325 A1 | 7/2014 | Johnson et al. |
| 2015/0158182 A1 | 6/2015 | Farlow et al. |
| 2015/0355638 A1 | 12/2015 | Field et al. |
| 2016/0375901 A1 | 12/2016 | di Cairano et al. |
| 2017/0017236 A1 | 1/2017 | Song et al. |
| 2017/0095383 A1 | 4/2017 | Li et al. |
| 2017/0120448 A1 | 5/2017 | Lee et al. |
| 2017/0131102 A1 | 5/2017 | Wirbel et al. |
| 2017/0165835 A1 | 6/2017 | Agarwal et al. |
| 2017/0203446 A1 | 7/2017 | Dooley et al. |
| 2017/0341235 A1 | 11/2017 | Baloch et al. |
| 2018/0051991 A1 | 2/2018 | Hong |
| 2018/0161986 A1 | 6/2018 | Kee et al. |
| 2018/0173242 A1 | 6/2018 | Lalonde et al. |
| 2018/0328737 A1 | 11/2018 | Frey et al. |
| 2018/0348742 A1 | 12/2018 | Byme et al. |
| 2019/0016312 A1 | 1/2019 | Carlson et al. |
| 2019/0056743 A1 | 2/2019 | Alesiani et al. |
| 2019/0079523 A1 | 3/2019 | Zhu et al. |
| 2019/0080463 A1 | 3/2019 | Davison et al. |
| 2019/0113927 A1 | 4/2019 | England et al. |
| 2019/0138029 A1 | 5/2019 | Ryll et al. |
| 2019/0171911 A1 | 6/2019 | Greenberg |
| 2019/0187699 A1 | 6/2019 | Salour et al. |
| 2019/0187703 A1 | 6/2019 | Millard et al. |
| 2019/0213896 A1 | 7/2019 | Gohi et al. |
| 2019/0318277 A1 | 10/2019 | Goldman et al. |
| 2020/0039427 A1 | 2/2020 | Chen et al. |
| 2020/0109954 A1 | 4/2020 | Li et al. |
| 2020/0117198 A1* | 4/2020 | Whitman ............... G05D 1/247 |
| 2020/0117214 A1 | 4/2020 | Jonak et al. |
| 2020/0164521 A1 | 5/2020 | Li |
| 2020/0174460 A1 | 6/2020 | Byme et al. |
| 2020/0192388 A1 | 6/2020 | Zhang et al. |
| 2020/0198140 A1 | 6/2020 | Dupuis et al. |
| 2020/0216061 A1 | 7/2020 | Zidek |
| 2020/0249033 A1 | 8/2020 | Gelhar |
| 2020/0258400 A1 | 8/2020 | Yuan et al. |
| 2020/0333790 A1 | 10/2020 | Kobayashi et al. |
| 2020/0386882 A1 | 12/2020 | Klein et al. |
| 2020/0409382 A1 | 12/2020 | Herman et al. |
| 2021/0041243 A1 | 2/2021 | Fay et al. |
| 2021/0041887 A1 | 2/2021 | Whitman et al. |
| 2021/0064055 A1 | 3/2021 | Jun |
| 2021/0141389 A1 | 5/2021 | Jonak et al. |
| 2021/0180961 A1 | 6/2021 | Oh |
| 2021/0200219 A1 | 7/2021 | Gaschler |
| 2021/0311480 A1 | 10/2021 | Yang et al. |
| 2021/0323618 A1 | 10/2021 | Komoroski |
| 2021/0382491 A1 | 12/2021 | Murotani et al. |
| 2022/0024034 A1 | 1/2022 | Wei et al. |
| 2022/0063662 A1 | 3/2022 | Sprunk et al. |
| 2022/0083062 A1 | 3/2022 | Jaquez et al. |
| 2022/0088776 A1 | 3/2022 | Kuffner |
| 2022/0137637 A1 | 5/2022 | Baldini et al. |
| 2022/0155078 A1 | 5/2022 | Fay et al. |
| 2022/0179420 A1 | 6/2022 | Whitman et al. |
| 2022/0244741 A1 | 8/2022 | Silva et al. |
| 2022/0276654 A1 | 9/2022 | Lee et al. |
| 2022/0342421 A1 | 10/2022 | Kearns et al. |
| 2022/0374024 A1 | 11/2022 | Whitman et al. |
| 2022/0388170 A1 | 12/2022 | Merewether |
| 2022/0390950 A1 | 12/2022 | Yamauchi |
| 2022/0390954 A1 | 12/2022 | Klingensmith |
| 2023/0062175 A1 | 3/2023 | Yahata |
| 2023/0071598 A1* | 3/2023 | Kinoshiata ........... G05D 1/0214 |
| 2023/0273621 A1 | 8/2023 | Okamori et al. |
| 2023/0309776 A1 | 10/2023 | Li et al. |
| 2023/0359220 A1 | 11/2023 | Jonak et al. |
| 2023/0400307 A1 | 12/2023 | Fay et al. |
| 2024/0061436 A1 | 2/2024 | Tsuzaki et al. |
| 2024/0165821 A1 | 5/2024 | Dabiri et al. |
| 2024/0361779 A1 | 10/2024 | Dellon et al. |

FOREIGN PATENT DOCUMENTS

| | | |
|---|---|---|
| CN | 103869820 A | 6/2014 |
| CN | 104075715 A | 10/2014 |
| CN | 104470685 A | 3/2015 |
| CN | 104536445 A | 4/2015 |

(56) References Cited

FOREIGN PATENT DOCUMENTS

| | | |
|---|---|---|
| CN | 106200633 A | 12/2016 |
| CN | 106371445 A | 2/2017 |
| CN | 107301654 A | 10/2017 |
| CN | 107943038 A | 4/2018 |
| CN | 108052103 | 5/2018 |
| CN | 108292473 A | 7/2018 |
| CN | 108801269 A | 11/2018 |
| CN | 109029417 A | 12/2018 |
| CN | 109540142 A | 3/2019 |
| CN | 113168184 | 7/2021 |
| CN | 113633219 | 11/2021 |
| CN | 114174766 | 3/2022 |
| CN | 114503043 | 5/2022 |
| DE | 102016206209 A1 | 10/2017 |
| JP | H 02127180 | 5/1990 |
| JP | H09-134217 | 11/2003 |
| JP | 2005-088189 | 4/2005 |
| JP | 2006-011880 | 1/2006 |
| JP | 2006-239844 | 9/2006 |
| JP | 2007-041656 | 2/2007 |
| JP | 2008-072963 | 4/2008 |
| JP | 2009-223628 | 10/2009 |
| JP | 2009-271513 | 11/2009 |
| JP | 2010-253585 | 11/2010 |
| JP | 2013-250795 | 12/2013 |
| JP | 2014-123200 | 7/2014 |
| JP | 2014-151370 | 8/2014 |
| JP | 2016-081404 | 5/2016 |
| JP | 2017-182502 | 10/2017 |
| JP | 2019500691 A | 1/2019 |
| JP | 2019-021197 | 2/2019 |
| JP | 2022-504039 | 1/2022 |
| JP | 2022-543997 | 10/2022 |
| JP | 7219812 | 2/2023 |
| JP | 7259020 | 4/2023 |
| KR | 10-1121763 | 3/2012 |
| KR | 20120019893 | 3/2012 |
| KR | 20130020107 A | 2/2013 |
| KR | 10-2022-0078563 | 6/2022 |
| KR | 20220083666 | 6/2022 |
| KR | 10-2023-0019497 | 2/2023 |
| KR | 10-2504729 | 2/2023 |
| KR | 10-2533690 | 5/2023 |
| KR | 10-2492242 | 6/2023 |
| WO | WO 2007/051972 | 5/2007 |
| WO | WO 2017/090108 | 6/2017 |
| WO | WO 2018/231616 | 12/2018 |
| WO | WO 2020/076418 | 4/2020 |
| WO | WO 2020/076422 | 4/2020 |
| WO | WO 2021/025707 | 2/2021 |
| WO | WO 2021/025708 | 2/2021 |
| WO | WO 2022/164832 | 8/2022 |
| WO | WO 2022/256811 | 12/2022 |
| WO | WO 2022/256815 | 12/2022 |
| WO | WO 2022/256821 | 12/2022 |
| WO | WO 2023/249979 | 12/2023 |
| WO | WO 2024/220811 A2 | 10/2024 |

OTHER PUBLICATIONS

Boston Dynamics, "Introducing Spot Classic (previously Spot)," https://www.youtube.com/watch?v=M8YjvHYbZ9w, Feb. 9, 2015, downloaded Aug. 10, 2023.

Boston Dynamics, "Introducing Spot (Previously SpotMini)," https://www.youtube.com/watch?v=tf7IEVTDjng, Jun. 23, 2016, downloaded Jul. 31, 2023.

Boston Dynamics, "Spot Autonomous Navigation," https://www.youtube.com/watch?v=Ve9kWX_KXus, May 10, 2018, downloaded Sep. 5, 2023.

Boston Dynamics, "Spot Robot Testing at Construction Sites,"https://www.youtube.com/watch?v=wND9goxDVrY&t=15s, Oct. 11, 2018, downloaded Sep. 5, 2023.

Boston Dynamics, "SpotMini", The Wayback Machine, http://web.archive.org/web/20171118145237/https://bostondynamics.com/spot-mini, downloaded Jul. 31, 2023, 3 pages.

Boston Dynamics, "Testing Robustness," https://www.youtube.com/watch?v=aFuA50H9uek, Feb. 20, 2018, downloaded Jul. 31, 2023.

Boston Dynamics, "The New Spot," https://www.youtube.com/watch?v=kgaO45SyaO4, Nov. 13, 2017, downloaded Jul. 31, 2023.

Lee et al., "A New Semantic Descriptor for Data Association in Semantic SLAM", 2019 109th International Conference on Control, Automation and Systems (ICCAS), Jeju, Korea (South), 2019, pp. 1178-1181, doi: 10.23919/ICCAS47443.2019.8971639.

International Search Report and Written Opinion for PCT Application No. PCT/US2019/051511, Jul. 1, 2020, 15 pages.

International Search Report and Written Opinion for PCT Application No. PCT/US2019/047804, Apr. 6, 2020, 14 pages.

International Search Report and Written Opinion for PCT Application No. PCT/US2019/051092, Apr. 30, 2020, 12 pages.

International Search Report and Written Opinion for PCT Application No. PCT/US2022/013777, May 6, 2022, 16 pages.

International Search Report and Written Opinion for PCT Application No. PCT/US2022/072710, Sep. 27, 2022, 16 pages.

International Search Report and Written Opinion for PCT Application No. PCT/US2023/025806, Oct. 11, 2023, 16 pages.

Abraham et al., "A Topological Approach of Path Planning for Autonomous Robot Navigation in Dynamic Environments", The 2009 IEEE/RSJ International Conference on Intelligent Robots and Systems, Oct. 11-15, 2009.

Alkautsar, "Topological Path Planning and Metric Path Planning", https://medium.com/@arifmaulanaa/topological-path-planning-and-metric-path-planning-5c0fa7f107f2, downloaded Feb. 13, 2023, 3 pages.

Boost.org, "buffer (with strategies)", https://www.boost.org/doc/libs/1_75_0/libs/geometry/doc/html/geometry/reference/algorithms/buffer/buffer_7_with_strategies.html, downloaded Feb. 1, 2023, 5 pages.

Buchegger et al., "An Autonomous Vehicle for Parcel Delivery in Urban Areas" International Conference on Intelligent Transporation Sytems (ITSC) Nov. 2018.

Cao, "Topological Path Planning For Crowd Navigation", https://www.ri.cmu.edu/app/uploads/2019/05/thesis.pdf, May 2019, 24 pages.

Collins et al. "Efficient Planning for High-Speed MAV Flight in Unknown Environments Using Online Sparse Topological Graphs" IEEE International Conference on Robotics and Automation (ICRA) Aug. 2020.

Github.com, "cartographer-project/cartographer", https://github.com/cartographer-project/cartographer, downloaded Feb. 1, 2023, 4 pages.

Kuipers et al., "A Robot Exploration and Mapping Strategy Based on a Semantic Hierarchy of Spatial Representations" Journal of Robotics & Autonomous Systems vol. 8, 1991, pp. 47-63.

Leon et al., "TIGRE: Topological Graph based Robotic Exploration", 2017 European Conference on Mobile Robots (ECMR), Paris, France, 2017, pp. 1-6, doi: 10.1109/ECMR.2017.8098718.

Mccammon et al., "Topological path planning for autonomous information gathering", Autonomous Robots 45, pp. 821-842 (2021), https://doi.org/10.1007/s10514-021-10012-x.

Mendes et al., "ICP-based pose-graph SLAM", International Symposium on Safety, Security and Rescue Robotics (SSRR), Oct. 2016, Lausanne, Switzerland pp. 195-200, ff10.1109/SSRR.2016.7784298, hal-01522248.

Poncela et al., "Efficient integration of metric and topological maps for directed exploration of unknown environments", Robotics and Autonomous Systems, Elsevier BV, Amsterdam, NL, vol. 41, No. 1, Oct. 31, 2002 (Oct. 31, 2002), pp. 21-39.

Tang, "Introduction to Robotics", The Wayback Machine, https://web.archive.org/web/20160520085742/http://www.cpp.edu:80/~ftang/courses/CS521/, downloaded Feb. 3, 2023, 58 pages.

Thrun et al., "The GraphSLAM Algorithm with Applications to Large-Scale Mapping of Urban Structures", The International Journal of Robotics Research, vol. 25, No. 5-6, May-Jun. 2006, pp. 403-429.

Video game, "Unreal Engine 5", https://docs.unrealengine.com/5.0/en-us/basic-navigation-in-unreal-engine/, downloaded Feb. 1, 2023, 15 pages.

(56) References Cited

OTHER PUBLICATIONS

Whelan et al., "ElasticFusion: Dense SLAM Without A Pose Graph", http://www.roboticsproceedings.org/rss11/p01.pdf, downloaded Feb. 1, 2023, 9 pages.
Wikipedia.org, "Buffer (GIS)", http://wiki.gis.com/wiki/index.php/Buffer_(GIS)#:~:text=A%20'polygon%20buffer'%20is%20a,Buffer%20around%20line%20features, downloaded Feb. 1, 2023, 4 pages.
Wikipedia.org, "Probabilistic roadmap", https://en.wikipedia.org/wiki/Probabilistic_roadmap, downloaded Feb. 1, 2023, 2 pages.
Wikipedia.org, "Rapidly-exploring random tree", https://en.wikipedia.org/wiki/Rapidly-exploring_random_tree, downloaded Feb. 1, 2023, 7 pages.
Wikipedia.org, "Visibility graph", https://en.wikipedia.org/wiki/Visibility_graph, downloaded Feb. 1, 2023, 3 pages.
Yamauchi et al., "Place Recognition in Dynamic Environments" Journal of Robotic Systems, Special Issue on Mobile Robots, vol. 14, No. 2, Feb. 1997, pp. 107-120.
Yamauchi et al., "Spatial Learning for Navigation in Dynamic Environments" IEEE Transactions on Systems, Man, and Cybernetics—Part B: Cybernetics, Special Issue on Learning Autonomous Robots, vol. 26, No. 3, Jun. 1996, pp. 496-505.
International Search Report and Written Opinion for PCT Application No. PCT/US2019/046646 dated Oct. 31, 2019 in 9 pages.
International Search Report and Written Opinion for PCT Application No. PCT/US2022/072703, Sep. 22, 2022, 13 pages.
International Search Report and Written Opinion for PCT Application No. PCT/US2022/072717, Sep. 30, 2022, 26 pages.
Liu et al., "Behavior-based navigation system of mobile robot in unknown environment", Industrial Control Comp. Dec. 25, 2017; 12: 28-30.
Song et al., "Environment model based path planning for mobile robot", Electronics Optics & Control, Jun. 30, 2006, 3: 102-104.
Matsumaru T., Mobile robot with preliminary-announcement and display function of forthcoming motion using projection equipment. In ROMAN 2006-The 15th IEEE International Symposium on Robot and Human Interactive Communication Sep. 6, 2006 (pp. 443-450).
Wei et al., "A method of autonomous robot navigation in dynamic unknown environment", J Comp Res Devel. Sep. 30, 2005; 9: 1538-1543.
Wengefeld et al., "A laser projection system for robot intention communication and human robotinteraction." In 2020 29th IEEE International Conference on Robot and Human Interactive Communication (RO-MAN) Aug. 31, 2020 (pp. 259-265).
International Search Report and Written Opinion for PCT Application No. PCT/US2024/025417, Nov. 5, 2024, 26 pages.

\* cited by examiner

GROUND CLUTTER AVOIDANCE FOR A MOBILE ROBOT

RELATED APPLICATIONS

This application claims the benefit under 35 U.S.C. § 119(e) of U.S. Provisional Patent Application Ser. No. 63/354,763, filed Jun. 23, 2022, and entitled, "GROUND CLUTTER AVOIDANCE FOR A MOBILE ROBOT," the entire contents of which is incorporated herein by reference.

BACKGROUND

A robot is generally a reprogrammable and multifunctional manipulator, often designed to move material, parts, tools, or specialized devices through variable programmed motions for performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

In some embodiments, a method of navigating a robot along a route through an environment, the route being associated with a mission is provided. The method comprises identifying, based on sensor data received by one or more sensors of the robot, a set of potential obstacles in the environment, determining, based at least in part on stored data indicating a set of footfall locations of the robot during a previous execution of the mission, that at least one of the potential obstacles in the set is an obstacle, and navigating the robot to avoid stepping on the obstacle.

In one aspect, the sensor data comprises image data. In one aspect, the sensor data comprises point cloud data representing distances to objects in the environment. In one aspect, the method further comprises processing the sensor data to generate a terrain map of the environment, and identifying the set of potential obstacles in the environment is based, at least in part, on the terrain map. In one aspect, the method further comprises segmenting the terrain map to generate a segmented map, and identifying the set of potential obstacles in the environment is based, at least in part, on the segmented map. In one aspect, segmenting the terrain map comprises detecting at least one boundary in the terrain map, and detecting at least one surface in the terrain map, wherein identifying the set of potential obstacles in the environment is based, at least in part, on the at least one boundary and the at least one surface. In one aspect, identifying the set of potential obstacles in the environment is based, at least in part, on the detected at least one boundary and the detected at least one surface comprises identifying a set of segments in the segmented map that include at least one boundary connected to at least one detected surface, and including in the set of potential obstacles, objects associated with at least some of the segments in the set of segments. In one aspect, the method further comprises discarding, from the set of segments, segments having a size below a threshold size, and including in the set of potential obstacles, objects associated with segments having a size above the threshold size.

In one aspect, determining, based at least in part on stored data indicating a set of footfall locations of the robot during a previous execution of the mission, that at least one of the potential obstacles in the set is an obstacle comprises, for each of the potential obstacles in the set comprises determining, based on the set of footfall locations, whether the robot stepped on the potential obstacle during the previous execution of the mission, and determining that the potential obstacle is an obstacle when it is determined that the robot did not step on the potential obstacle during the previous execution of the mission. In one aspect, the set of footfall locations comprises upcoming footfall locations along a portion of the route that the robot has not yet traversed, and determining, based on the set of footfall locations, whether the robot stepped on the potential obstacle during the previous execution of the mission comprises determining whether the robot stepped on the potential obstacle based on one or more of the upcoming footfall locations along the route that the robot has not yet traversed.

In one aspect, the method further comprises identifying, based on the sensor data, a set of one or more large obstacles in the environment of the robot, adding the obstacle to the set of one or more large obstacles, and navigating the robot to avoid stepping on all of the obstacles in the set of one or more large obstacles. In one aspect, a height of the obstacle is less than 30 cm. In one aspect, the previous execution of the mission corresponds to an execution of the mission when the mission was recorded during operation of the robot by an operator.

In some embodiments, a legged robot is provided. The legged robot comprises a perception system including one or more sensors configured to sense sensor data and at least one computer processor. The at least one computer processor is configured to identify, based on the sensor data, a set of potential obstacles in the environment and determine, based at least in part on stored data indicating a set of footfall locations of the robot during a previous execution of the mission, that at least one of the potential obstacles in the set is an obstacle. The legged robot further comprises a navigation system configured to navigate the robot to avoid stepping on the obstacle.

In one aspect, the sensor data comprises image data. In one aspect, the sensor data comprises point cloud data representing distances to objects in the environment. In one aspect, the at least one computer processor is further configured to process the sensor data to generate a terrain map of the environment, and identifying the set of potential obstacles in the environment is based, at least in part, on the terrain map. In one aspect, the at least one computer processor is further configured to segment the terrain map to generate a segmented map, and identifying the set of potential obstacles in the environment is based, at least in part, on the segmented map. In one aspect, segmenting the terrain map comprises detecting at least one boundary in the terrain map, and detecting at least one surface in the terrain map, wherein identifying the set of potential obstacles in the environment is based, at least in part, on the at least one boundary and the at least one surface. In one aspect, identifying the set of potential obstacles in the environment is based, at least in part, on the detected at least one boundary and the detected at least one surface comprises identifying a set of segments in the segmented map that include at least one boundary connected to at least one detected surface; and including in the set of potential obstacles, objects associated with at least some of the segments in the set of segments. In one aspect, the at least one computer processor is further configured to discard, from the set of segments, segments having a size below a threshold size, and include in the set of potential obstacles, objects associated with segments having a size above the threshold size.

In one aspect, determining, based at least in part on stored data indicating a set of footfall locations of the robot during a previous execution of the mission, that at least one of the potential obstacles in the set is an obstacle comprises, for each of the potential obstacles in the set comprises determining, based on the set of footfall locations, whether the robot stepped on the potential obstacle during the previous execution of the mission, and determining that the potential obstacle is an obstacle when it is determined that the robot did not step on the potential obstacle during the previous execution of the mission. In one aspect, the set of footfall locations comprises upcoming footfall locations along a portion of the route that the robot has not yet traversed, and determining, based on the set of footfall locations, whether the robot stepped on the potential obstacle during the previous execution of the mission comprises determining whether the robot stepped on the potential obstacle based on one or more of the upcoming footfall locations along the route that the robot has not yet traversed.

In one aspect, the at least one computer processor is further programmed to identify, based on the sensor data, a set of one or more large obstacles in the environment of the robot, add the obstacle to the set of one or more large obstacles, and navigate the robot to avoid stepping on all of the obstacles in the set of one or more large obstacles. In one aspect, a height of the obstacle is less than 30 cm. In one aspect, the previous execution of the mission corresponds to an execution of the mission when the mission was recorded during operation of the robot by an operator.

In some embodiments, a non-transitory computer readable medium is provided. The non-transitory computer readable medium is encoded with a plurality of instructions that, when executed by at least one computer processor perform a method of navigating a robot along a route through an environment, the route being associated with a mission. The method comprises identifying, based on sensor data received by one or more sensors of the robot, a set of potential obstacles in the environment, determining, based at least in part on stored data indicating a set of footfall locations of the robot during a previous execution of the mission, that at least one of the potential obstacles in the set is an obstacle, and navigating the robot to avoid stepping on the obstacle.

In one aspect, the sensor data comprises image data. In one aspect, the sensor data comprises point cloud data representing distances to objects in the environment. In one aspect, the method further comprises processing the sensor data to generate a terrain map of the environment, and identifying the set of potential obstacles in the environment is based, at least in part, on the terrain map. In one aspect, the method further comprises segmenting the terrain map to generate a segmented map, and identifying the set of potential obstacles in the environment is based, at least in part, on the segmented map. In one aspect, segmenting the terrain map comprises detecting at least one boundary in the terrain map, and detecting at least one surface in the terrain map, wherein identifying the set of potential obstacles in the environment is based, at least in part, on the at least one boundary and the at least one surface. In one aspect, identifying the set of potential obstacles in the environment is based, at least in part, on the detected at least one boundary and the detected at least one surface comprises identifying a set of segments in the segmented map that include at least one boundary connected to at least one detected surface, and including in the set of potential obstacles, objects associated with at least some of the segments in the set of segments. In one aspect, the method further comprises discarding, from the set of segments, segments having a size below a threshold size, and including in the set of potential obstacles, objects associated with segments having a size above the threshold size.

In one aspect, determining, based at least in part on stored data indicating a set of footfall locations of the robot during a previous execution of the mission, that at least one of the potential obstacles in the set is an obstacle comprises, for each of the potential obstacles in the set comprises determining, based on the set of footfall locations, whether the robot stepped on the potential obstacle during the previous execution of the mission, and determining that the potential obstacle is an obstacle when it is determined that the robot did not step on the potential obstacle during the previous execution of the mission. In one aspect, the set of footfall locations comprises upcoming footfall locations along a portion of the route that the robot has not yet traversed, and determining, based on the set of footfall locations, whether the robot stepped on the potential obstacle during the previous execution of the mission comprises determining whether the robot stepped on the potential obstacle based on one or more of the upcoming footfall locations along the route that the robot has not yet traversed.

In one aspect, the method further comprises identifying, based on the sensor data, a set of one or more large obstacles in the environment of the robot, adding the obstacle to the set of one or more large obstacles, and navigating the robot to avoid stepping on all of the obstacles in the set of one or more large obstacles. In one aspect, a height of the obstacle is less than 30 cm. In one aspect, the previous execution of the mission corresponds to an execution of the mission when the mission was recorded during operation of the robot by an operator.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1A:
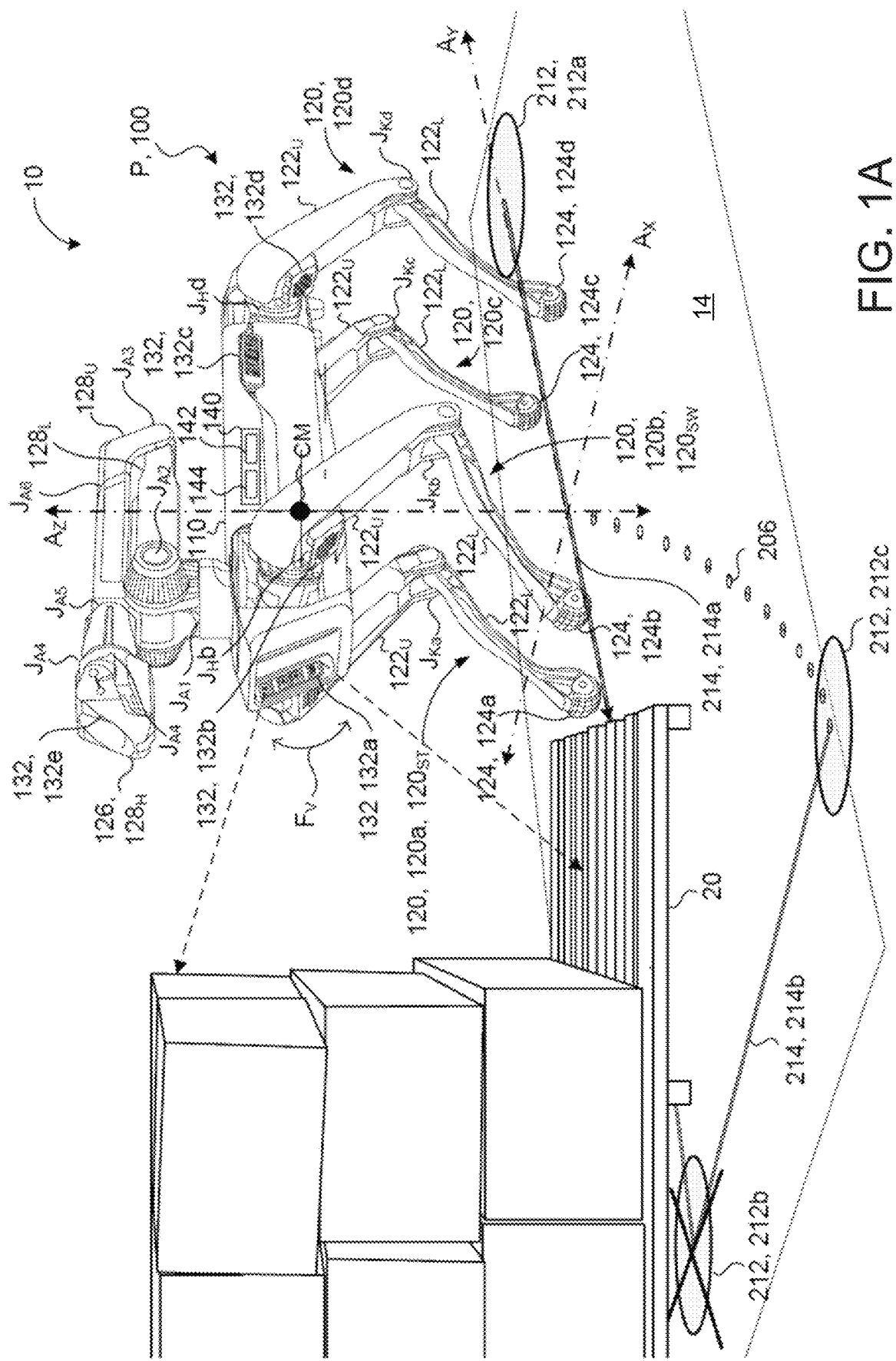
FIG. 1A illustrates an example of a legged robot configured to navigate in an environment along a route, in accordance with some embodiments.

Some robots are used to navigate environments to perform a variety of tasks or functions. These robots are often operated to perform a "mission" by navigating the robot through an environment. The mission is sometimes recorded so that the robot can again perform the mission at a later time. In some missions, a robot both navigates through and interacts with the environment. The interaction sometimes takes the form of gathering data using one or more sensors.

A robot may be configured to execute missions to accomplish particular objectives, such as performing surveillance, collecting sensor data, etc. As example of a robot 100 that is capable of performing such missions is described below in connection with FIGS. 1A-B. To enable the robot 100 to execute a mission, the robot 100 may undergo an initial mapping process during which the robot 100 moves about an environment 10 (typically in response to commands input by a user to a tablet or other controller) to gather data (e.g., via one or more sensors) about the environment 10 and may generate a topological map 204 (an example of which is shown in FIG. 2A) that defines waypoints 212 along a path travelled by the robot 100 and edges 214 representing paths between respective pairs of waypoints 212. Individual waypoints 212 may, for example, be associated with sensor data, fiducials, and/or robot pose information at specific times and places, whereas individual edges 214 may connect waypoints 212 topologically.

In some existing systems, a given "mission recording" may identify a sequence of actions that are to take place at particular waypoints 212 included on a topological map 204. For instance, a mission recording may indicate that the robot 100 is to go to a first waypoint 212 and perform a first action, then go to a second waypoint 212 and perform a second action, etc. In some implementations, such a mission recording need not specify all of the waypoints 212 the robot 100 will actually traverse when the mission is executed, and may instead specify only those waypoints 212 at which particular actions are to be performed. As explained in detail below, such a mission recording may be executed by a mission execution system 184 (shown in FIG. 1B) of the robot 100. The mission execution system 184 may communicate with other systems of the robot 100, as needed, to execute the mission successfully. For instance, in some implementations, the mission execution system 184 may communicate with a navigation system 200 (also shown in FIG. 1B) requesting that the navigation system 200 determine, using a topological map 204 and the mission recording, a navigation route 202 that includes the various waypoints 212 of the topological map 204 that are identified in the mission recording, as well as any number of additional waypoints 212 of the topological map 204 that are located between the waypoints 212 that are identified in the mission recording. The determined navigation route 202 may likewise include the edges 214 that are located between respective pairs of such waypoints 212. Causing the robot to follow a navigation route 202 that includes all of the waypoints 212 identified in the mission recording may enable the mission execution system 184 to perform the corresponding actions in the mission recording when the robot 100 reaches those waypoints 212.

As described below with reference to FIG. 2A, the navigation system 200 may include a navigation generator 210 that can generate a navigation route 202 that includes specified waypoints 212 (e.g., the waypoints identified in a mission recording), as well as a route executor 220 configured to control the robot 100 to move along the identified navigation route 202, possibly re-routing the robot along an alternate path 206, e.g., if needed to avoid an obstacle 20 that may not have been present at the time of recording of the mission.

In some existing systems, the route executor 220 may determine to re-route the robot around all obstacles (e.g., obstacle 20) along the route that the robot cannot traverse over. When making re-routing decisions, such systems may not take into consideration the presence of smaller objects along the route upon which the robot may step during execution of the mission when travelling along the route. Rather than navigating around such smaller objects to avoid them by taking an alternate path than that specified in the mission recording, some existing systems simply follow the route as specified by the waypoints and edges in the mission recording, which may result in the robot stepping on or otherwise traversing over such smaller objects. The inventors have recognized and appreciated that failing to re-route around at least some of the smaller objects in the environment of the robot may result in damage to delicate objects (e.g., light bulbs, tools) and/or may cause the robot to trip and fall when stepping on or in certain objects such as open buckets or boxes, potentially causing damage to the robot.

Some embodiments of the present disclosure relate to techniques for detecting and/or classifying "ground clutter" objects in the environment of a robot, thereby enabling the robot to avoid stepping on such objects, improving mission robustness and reducing potential damage to the robot and/or the objects in the environment. Also referred to herein as "ground clutter avoidance," some embodiments relate to techniques for identifying objects in the environment that a robot should not step on or traverse (e.g., walk) over to reduce the possibility of robot and/or environment damage. By modelling smaller objects in the local environment around the robot, the obstacle avoidance capabilities of the robot (e.g., previously primarily focused on avoiding larger objects) are improved resulting in less damage to the robot and objects in its environment during execution of missions. For instance, obstacles with flat surfaces may otherwise appear to be suitable places for the robot to step, though doing so may cause damage to the obstacle and/or the robot. As described in more detail below, in some embodiments, during execution of a mission, objects in the environment (e.g., objects located on the ground) are detected and information describing how the robot traversed (e.g., stepped) in the environment during a previous execution of the mission (e.g., during recording of the mission) is used, at least in part, to decide which objects are acceptable to traverse (e.g., step on) and which objects the robot should be re-routed around.

Figure 2A:
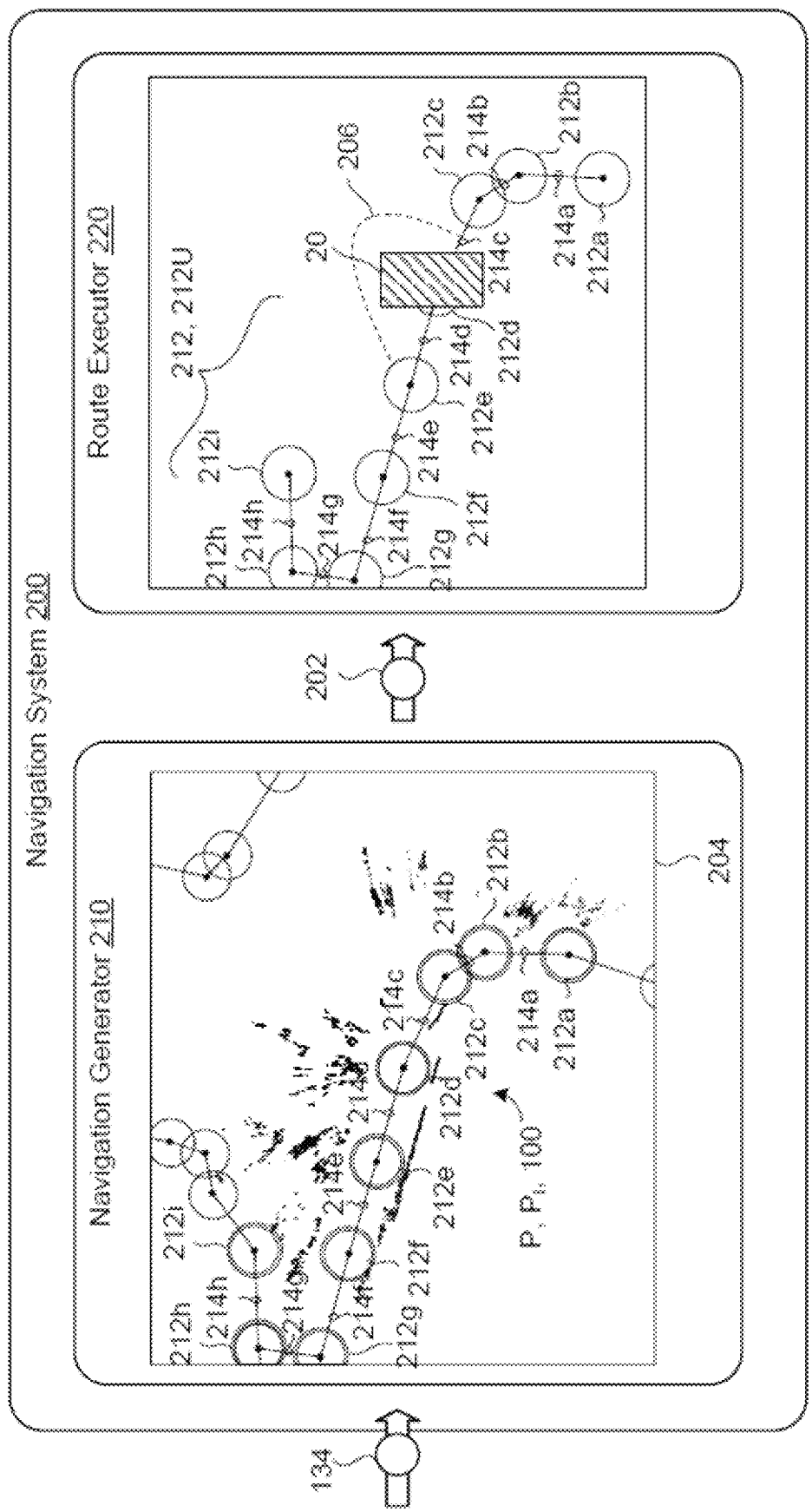
FIG. 2A illustrates components of a navigation system used to navigate a robot, such as the robot of FIG. 1A in an environment, in accordance with some embodiments.

Referring to FIG. 1A, a robot 100 may include a body 110 with locomotion based structures such as legs 120a-d coupled to the body 110 that enable the robot 100 to move about an environment 10. In some implementations, each leg 120 may be an articulable structure such that one or more joints J permit members 122 of the leg 120 to move. For instance, each leg 120 may include a hip joint $J_H$ coupling an upper member 122, $122_U$ of the leg 120 to the body 110, and a knee joint $J_K$ coupling the upper member $122_U$ of the leg 120 to a lower member $122_L$ of the leg 120. For impact detection, the hip joint $J_H$ may be further broken down into abduction-adduction rotation of the hip joint $J_H$ for occurring in a frontal plane of the robot 100 (i.e., an X-Z plane extending in directions of the x-direction axis $A_x$ and the z-direction axis $A_Z$) and a flexion-extension rotation of the hip joint $J_H$ for occurring in a sagittal plane of the robot 100 (i.e., a Y-Z plane extending in directions of the y-direction axis $A_Y$ and the z-direction axis $A_Z$). Although FIG. 1A depicts a quadruped robot with four legs 120a-d, it should be appreciated that the robot 100 may include any number of legs or locomotive based structures (e.g., a biped or humanoid robot with two legs) that provide a means to traverse the terrain within the environment 10.

In order to traverse the terrain, each leg 120 may have a distal end 124 that contacts a surface 14 of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 may correspond to a "foot" of the robot 100. In some examples, although not shown, the distal end 124 of the leg 120 may include an ankle joint such that the distal end 124 is articulable with respect to the lower member $122_L$ of the leg 120.

In the illustrated example, the robot 100 includes an arm 126 that functions as a robotic manipulator. The arm 126 may be configured to move about multiple degrees of freedom in order to engage elements of the environment 10 (e.g., objects within the environment 10). In some implementations, the arm 126 may include one or more members $128_U$, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., also referred to as an end-effector $128_H$). Here, the lower member $128_L$ may rotate or pivot about one or more arm joints JA located adjacent to the body 110 (e.g., where the arm 126 connects to the body 110 of the robot 100). For example, FIG. 1A depicts the arm 126 able to rotate about a first arm joint $J_{A1}$ or yaw arm joint. With a yaw arm joint, the arm 126 is able to rotate in "360" degrees (or some portion thereof) axially about a vertical gravitational axis (e.g., shown as $A_z$) of the robot 100. The lower member $128_L$ may pivot (e.g., while rotating) about a second arm joint $J_{A2}$. For instance, the second arm joint $J_{A2}$ (shown adjacent the body 110 of the robot 100) allows the arm 126 to pitch to a particular angle (e.g., raising or lowering one or more members 128 of the arm 126). The lower member $128_L$ may be coupled to the upper member $128_U$ at a third arm joint $J_{A3}$ and the upper member $128_U$ may be coupled to the hand member $128_H$ at a fourth arm joint $J_{A4}$. In some examples, such as FIG. 1A, the hand member $128_H$ or end-effector $128_H$ may be a mechanical gripper that includes a one or more moveable jaws configured to perform different types of grasping of elements within the environment 10. In the example shown, the end-effector $128_H$ includes a fixed first jaw and a moveable second jaw that grasps objects by clamping the object between the jaws. The moveable jaw may be configured to move relative to the fixed jaw in order to move between an open position for the gripper and a closed position for the gripper (e.g., closed around an object).

In some implementations, the arm 126 may include additional joints JA such as the fifth arm joint JA5 and/or the sixth arm joint JA6. The fifth joint JA5 may be located near the coupling of the upper member 128U to the hand member 128H and may function to allow the hand member 128H to twist or to rotate relative to the lower member 128U. In other words, the fifth arm joint JA5 may function as a twist joint similarly to the fourth arm joint JA4 or wrist joint of the arm 126 adjacent the hand member 128H. For instance, as a twist joint, one member coupled at the joint J may move or rotate relative to another member coupled at the joint J (e.g., a first member portion coupled at the twist joint is fixed while the second member portion coupled at the twist joint rotates). Here, the fifth joint JA5 may also enable the arm 126 to turn in a manner that rotates the hand member 128H such that the hand member 128H may yaw instead of pitch. For instance, the fifth joint JA5 may allow the arm 126 to twist within a "180" degree range of motion such that the jaws associated with the hand member 128H may pitch, yaw, or some combination of both. This may be advantageous for hooking some portion of the arm 126 around objects or refining the how the hand member 128H grasps an object. The sixth arm joint JA6 may function similarly to the fifth arm joint JA5 (e.g., as a twist joint). For example, the sixth arm joint JA6 may also allow a portion of an arm member 128 (e.g., the upper arm member 128U) to rotate or twist within a "180" degree range of motion (e.g., with respect to another portion of the arm member 128 or another arm member 128). Here, a combination of the range of motion from the fifth arm joint JA5 and the sixth arm joint JA6 may enable "360" degree rotation. In some implementations, the arm 126 may connect to the robot 100 at a socket on the body 110 of the robot 100. In some configurations, the socket may be configured as a connector such that the arm 126 may attach or detach from the robot 100 depending on whether the arm 126 is needed for operation. In some examples, the first and second arm joints JA1,2 may be located at, adjacent to, or a portion of the socket that connects the arm 126 to the body 110.

The robot 100 may have a vertical gravitational axis (e.g., shown as a Z-direction axis $A_z$) along a direction of gravity, and a center of mass CM, which is a point where the weighted relative position of the distributed mass of the robot 100 sums to zero. The robot 100 may further have a pose P based on the CM relative to the vertical gravitational axis $A_z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 may alter the pose P of the robot 100 (i.e., the combination of the position of the CM of the robot and the attitude or orientation of the robot 100). Here, a height (i.e., vertical distance) generally refers to a distance along (e.g., parallel to) the z-direction (i.e., z-axis $A_Z$). The sagittal plane of the robot 100 corresponds to the Y-Z plane extending in directions of the y-direction axis $A_Y$ and the z-direction axis $A_z$. In other words, the sagittal plane bisects the robot 100 into a left and right side. Generally perpendicular to the sagittal plane, a ground plane (also referred to as a transverse plane) spans the X-Y plane by extending in directions of the x-direction axis Ax and the y-direction axis Ay. The ground plane refers to a support surface 14 where distal ends 124 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis Ax and the z-direction axis $A_Z$.

When a legged robot moves about the environment 10, the legs 120 of the robot may undergo a gait cycle. Generally, a gait cycle begins when a leg 120 touches down or contacts a support surface 14 and ends when that same leg 120 once again contacts the ground surface 14. The touching down of a leg 120 may also be referred to as a "footfall" defining a point or position where the distal end 124 of a locomotion-based structure 120 falls into contact with the support surface 14. The gait cycle may predominantly be divided into two phases, a swing phase and a stance phase. During the swing phase, a leg 120 may undergo (i) lift-off from the support surface 14 (also sometimes referred to as toe-off and the transition between the stance phase and swing phase), (ii) flexion at a knee joint $J_K$ of the leg 120, (iii) extension of the knee joint $J_K$ of the leg 120, and (iv) touchdown (or footfall) back to the support surface 14. Here, a leg 120 in the swing phase is referred to as a swing leg $120_{SW}$. As the swing leg $120_{SW}$ proceeds through the movement of the swing phase $120_{SW}$, another leg 120 performs the stance phase. The stance phase refers to a period of time where a distal end 124 (e.g., a foot) of the leg 120 is on the support surface 14. During the stance phase, a leg 120 may undergo (i) initial support surface contact which triggers a transition from the swing phase to the stance phase, (ii) loading response where the leg 120 dampens support surface contact, (iii) mid-stance support for when the contralateral leg (i.e., the swing leg $120_{SW}$) lifts-off and swings to a balanced position (about halfway through the swing phase), and (iv) terminal-stance support from when the robot's CM is over the leg 120 until the contralateral leg 120 touches down to the support surface 14. Here, a leg 120 in the stance phase is referred to as a stance leg $120_{ST}$.

In order to maneuver about the environment 10 or to perform tasks using the arm 126, the robot 100 may include a sensor system 130 with one or more sensors 132, 132a-n. For instance, FIG. 1A illustrates a first sensor 132, 132a mounted at a head of the robot 100, a second sensor 132, 132b mounted near the hip of the second leg 120b of the robot 100, a third sensor 132, 132c corresponding one of the sensors 132 mounted on a side of the body 110 of the robot 100, a fourth sensor 132, 132d mounted near the hip of the fourth leg 120d of the robot 100, and a fifth sensor 132, 132e mounted at or near the end-effector $128_H$ of the arm 126 of the robot 100. The sensors 132 may include vision/image sensors, inertial sensors (e.g., an inertial measurement unit (IMU)), force sensors, and/or kinematic sensors. Some examples of sensors 132 include a camera such as a stereo camera, a time-of-flight (TOF) sensor, a scanning light-detection and ranging (LIDAR) sensor, or a scanning laser-detection and ranging (LADAR) sensor. In some implementations, the respective sensors 132 may have corresponding fields of view $F_V$, defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

In some implementations, the sensor system 130 may include sensor(s) 132 coupled to a joint J. In some implementations, these sensors 132 may be coupled to a motor that operates a joint J of the robot 100 (e.g., sensors 132, 132a-b). Here, these sensors 132 may generate joint dynamics in the form of joint-based sensor data 134 (shown in FIG. 1B). Joint dynamics collected as joint-based sensor data 134 may include joint angles (e.g., an upper member $122_u$ relative to a lower member 122O, joint speed (e.g., joint angular velocity or joint angular acceleration), and/or joint torques experienced at a joint J (also referred to as joint forces). Here, joint-based sensor data 134 generated by one or more sensors 132 may be raw sensor data, data that is further processed to form different types of joint dynamics, or some combination of both. For instance, a sensor 132 may measure joint position (or a position of member(s) 122 coupled at a joint J) and systems of the robot 100 may perform further processing to derive velocity and/or acceleration from the positional data. In other examples, one or more sensors 132 may be configured to measure velocity and/or acceleration directly.

When surveying a field of view $F_V$ with a sensor 132, the sensor system 130 may likewise generate sensor data 134 (also referred to as image data) corresponding to the field of view $F_V$. The sensor system 130 may generate the field of view $F_v$ with a sensor 132 mounted on or near the body 110 of the robot 100 (e.g., sensor(s) 132a, 132b). The sensor system may additionally and/or alternatively generate the field of view $F_v$ with a sensor 132 mounted at or near the end-effector $128_H$ of the arm 126 (e.g., sensor(s) 132c).

The one or more sensors 132 may capture sensor data 134 that defines the three-dimensional point cloud for the area within the environment 10 about the robot 100. In some examples, the sensor data 134 may be image data that corresponds to a three-dimensional volumetric point cloud generated by a three-dimensional volumetric image sensor 132.

Additionally or alternatively, when the robot 100 is maneuvering about the environment 10, the sensor system 130 may gather pose data for the robot 100 that includes inertial measurement data (e.g., measured by an IMU). In some examples, the pose data may include kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 10 about the robot 100.

As the sensor system 130 gathers sensor data 134, a computing system 140 may store, process, and/or communicate the sensor data 134 to various systems of the robot 100 (e.g., the computing system 140, the control system 170, the perception system 180, and/or the navigation system 200). In order to perform computing tasks related to the sensor data 134, the computing system 140 of the robot 100 may include data processing hardware 142 and memory hardware 144. The data processing hardware 142 may be configured to execute instructions stored in the memory hardware 144 to perform computing tasks related to activities (e.g., movement and/or movement-based activities) for the robot 100. Generally speaking, the computing system 140 refers to one or more instances of data processing hardware 142 and/or memory hardware 144.

Figure 1B:
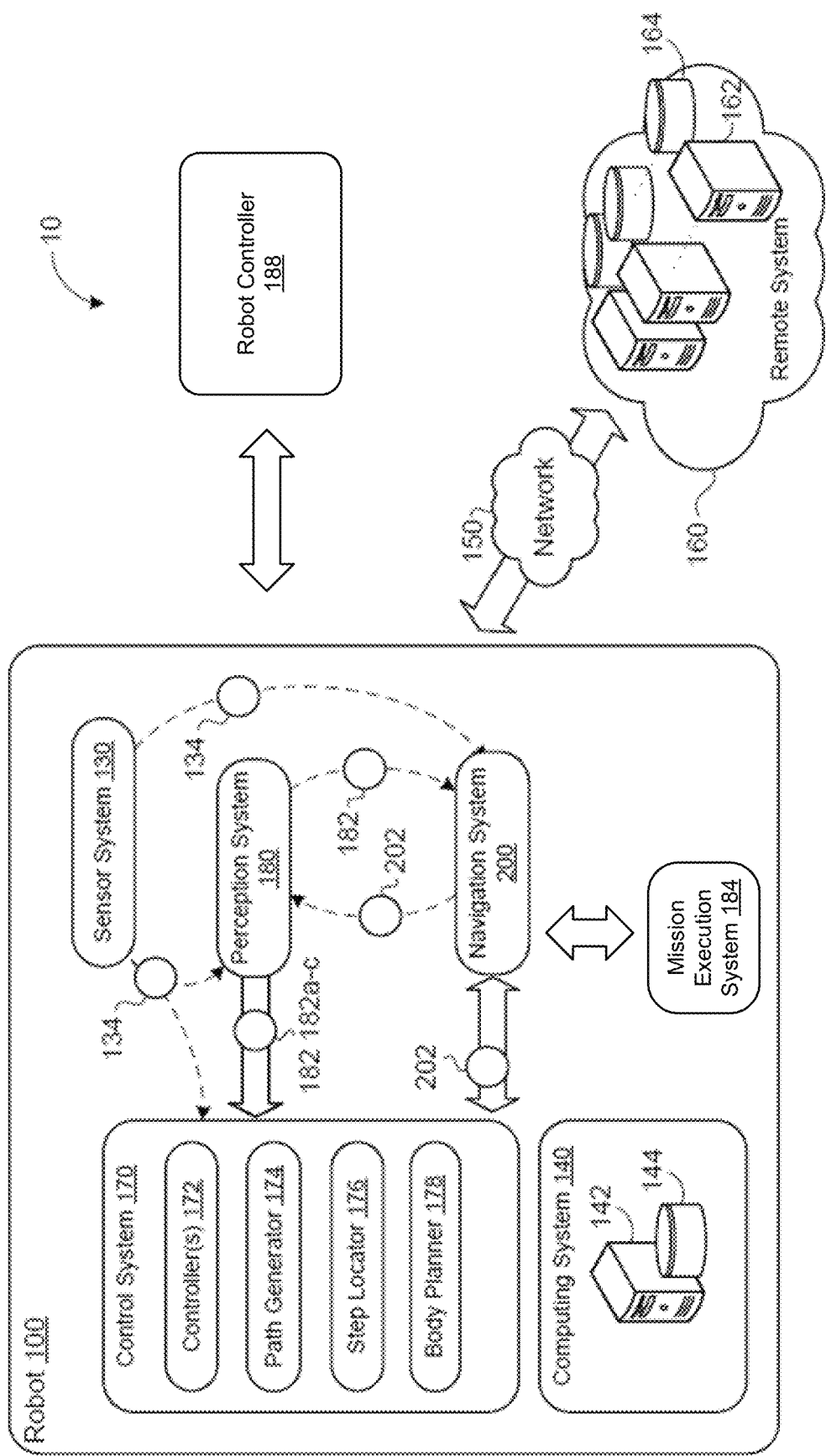
FIG. 1B is a block diagram of components of a robot, such as the robot shown in FIG. 1A.

With continued reference to FIGS. 1A and 1B, in some implementations, the computing system 140 may be a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). A decentralized computing system 140 may, for example, allow processing to occur at an activity location (e.g., at motor that moves a joint of a leg 120) while a centralized computing system 140 may, for example, allow for a central processing hub that communicates to systems located at various positions on the robot 100 (e.g., communicate to the motor that moves the joint of the leg 120).

Additionally or alternatively, the computing system 140 may include computing resources that are located remotely from the robot 100. For instance, the computing system 140 may communicate via a network 150 with a remote system 160 (e.g., a remote computer/server or a cloud-based environment). Much like the computing system 140, the remote system 160 may include remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some implementations, the computing system 140 may be configured to utilize the remote resources 162, 164 as extensions of the computing resources 142, 144 such that resources of the computing system 140 may reside on resources of the remote system 160.

In some implementations, as shown in FIGS. 1A and 1B, the robot 100 may include a control system 170 and a perception system 180. The perception system 180 may be configured to receive the sensor data 134 from the sensor system 130 and process the sensor data 134 to generate one or more perception maps 182. The perception system 180 may communicate such perception map(s) 182 to the control system 170 in order to perform controlled actions for the robot 100, such as moving the robot 100 about the environment 10. In some implementations, by having the perception system 180 separate from, yet in communication with the control system 170, processing for the control system 170 may focus on controlling the robot 100 while the processing for the perception system 180 may focus on interpreting the sensor data 134 gathered by the sensor system 130. For instance, these systems 170, 180 may execute their processing in parallel to ensure accurate, fluid movement of the robot 100 in an environment 10.

In some implementations, the control system 170 may include one or more controllers 172, a path generator 174, a step locator 176, and a body planner 178. The control system 170 may be configured to communicate with at least one sensor system 130 and any other system of the robot 100 (e.g., the perception system 180 and/or the navigation system 200). The control system 170 may perform operations and other functions using hardware 140. The controller(s) 172 may be configured to control movement of the robot 100 to traverse about the environment 10 based on input or feedback from the systems of the robot 100 (e.g., the control system 170, the perception system 180, and/or the navigation system 200). This may include movement between poses and/or behaviors of the robot 100. For example, the controller(s) 172 may control different footstep patterns, leg patterns, body movement patterns, or vision system sensing patterns.

In some implementations, the controller(s) 172 may include a plurality of controllers 172 where each of the controllers 172 may be configured to operate the robot 100 at a fixed cadence. A fixed cadence refers to a fixed timing for a step or swing phase of a leg 120. For example, an individual controller 172 may instruct the robot 100 to move the legs 120 (e.g., take a step) at a particular frequency (e.g., step every 250 milliseconds, 350 milliseconds, etc.). With a plurality of controllers 172, where each controller 172 is configured to operate the robot 100 at a fixed cadence, the robot 100 can experience variable timing by switching between the different controllers 172. In some implementations, the robot 100 may continuously switch/select fixed cadence controllers 172 (e.g., re-selects a controller 170 every three milliseconds) as the robot 100 traverses the environment 10.

In some implementations, the control system 170 may additionally or alternatively include one or more specialty controllers 172 that are dedicated to a particular control purpose. For example, the control system 170 may include one or more stair controllers dedicated to planning and coordinating the robot's movement to traverse a set of stairs. For instance, a stair controller may ensure the footpath for a swing leg $120_{SW}$ maintains a swing height to clear a riser and/or edge of a stair. Other specialty controllers 172 may include the path generator 174, the step locator 176, and/or the body planner 178.

Referring to FIG. 1B, the path generator 174 may be configured to determine horizontal motion for the robot 100. As used herein, the term "horizontal motion" refers to translation (i.e., movement in the X-Y plane) and/or yaw (i.e., rotation about the Z-direction axis $A_Z$) of the robot 100. The path generator 174 may determine obstacles within the environment 10 about the robot 100 based on the sensor data 134. The path generator 174 may determine the trajectory of the body 110 of the robot for some future period (e.g., for the next one second). Such determination of the trajectory of the body 110 by the path generator 174 may occur much more frequently, however, such as hundreds of times per second. In this manner, in some implementations, the path generator 174 may determine a new trajectory for the body 110 every few milliseconds, with each new trajectory being planned for a period of one or so seconds into the future.

The path generator 174 may communicate information concerning currently planned trajectory, as well as identified obstacles, to the step locator 176 such that the step locator 176 may identify foot placements for legs 120 of the robot 100 (e.g., locations to place the distal ends 124 of the legs 120 of the robot 100). The step locator 176 may generate the foot placements (i.e., locations where the robot 100 should step) using inputs from the perception system 180 (e.g., perception map(s) 182). The body planner 178, much like the step locator 176, may receive inputs from the perception system 180 (e.g., perception map(s) 182). Generally speaking, the body planner 178 may be configured to adjust dynamics of the body 110 of the robot 100 (e.g., rotation, such as pitch or yaw and/or height of CM) to successfully move about the environment 10.

The perception system 180 may enable the robot 100 to move more precisely in a terrain with various obstacles. As the sensors 132 collect sensor data 134 for the space about the robot 100 (i.e., the robot's environment 10), the perception system 180 may use the sensor data 134 to form one or more perception maps 182 for the environment 10. In some implementations, the perception system 180 may also be configured to modify an existing perception map 182 (e.g., by projecting sensor data 134 on a preexisting perception map) and/or to remove information from a perception map 182.

In some implementations, the one or more perception maps 182 generated by the perception system 180 may include a ground height map 182, 182a, a no step map 182, 182b, and a body obstacle map 182, 182c. The ground height map 182a refers to a perception map 182 generated by the perception system 180 based on voxels from a voxel map. In some implementations, the ground height map 182a may function such that, at each X-Y location within a grid of the perception map 182 (e.g., designated as a cell of the ground height map 182a), the ground height map 182a specifies a height. In other words, the ground height map 182a may convey that, at a particular X-Y location in a horizontal plane, the robot 100 should step at a certain height.

The no step map 182b generally refers to a perception map 182 that defines regions where the robot 100 is not allowed to step in order to advise the robot 100 when the robot 100 may step at a particular horizontal location (i.e., location in the X-Y plane). In some implementations, much like the body obstacle map 182c and the ground height map 182a, the no step map 182b may be partitioned into a grid of cells in which each cell represents a particular area in the environment 10 of the robot 100. For instance, each cell may correspond to a three centimeter square within an X-Y plane within the environment 10. When the perception system 180 generates the no-step map 182b, the perception system 180 may generate a Boolean value map where the Boolean value map identifies no step regions and step regions. A no step region refers to a region of one or more cells where an obstacle exists while a step region refers to a region of one or more cells where an obstacle is not perceived to exist. The perception system 180 may further process the Boolean value map such that the no step map 182b includes a signed-distance field. Here, the signed-distance field for the no step map 182b may include a distance to a boundary of an obstacle (e.g., a distance to a boundary of the no step region) and a vector "v" (e.g., defining nearest direction to the boundary of the no step region) to the boundary of an obstacle.

The body obstacle map 182c may be used to determine whether the body 110 of the robot 100 overlaps a location in the X-Y plane with respect to the robot 100. In other words, the body obstacle map 182c may identify obstacles for the robot 100 to indicate whether the robot 100, by overlapping at a location in the environment 10, risks collision or potential damage with obstacles near or at the same location. As a map of obstacles for the body 110 of the robot 100, systems of the robot 100 (e.g., the control system 170) may use the body obstacle map 182c to identify boundaries adjacent, or nearest to, the robot 100 as well as to identify directions (e.g., an optimal direction) to move the robot 100 in order to avoid an obstacle. In some implementations, much like other perception maps 182, the perception system 180 may generate the body obstacle map 182c according to a grid of cells (e.g., a grid of the X-Y plane). Here, each cell within the body obstacle map 182c may include a distance from an obstacle and a vector pointing to the closest cell that is an obstacle (i.e., a boundary of the obstacle).

Referring further to FIG. 1B, the robot 100 may also include a navigation system 200 and a mission execution system 184. The navigation system 200 may be a system of the robot 100 that navigates the robot 100 along a path referred to as a navigation route 202 in order to traverse an environment 100. The navigation system 200 may be configured to receive the navigation route 202 as input or to generate the navigation route 202 (e.g., in its entirety or some portion thereof). To generate the navigation route 202 and/or to guide the robot 100 along the navigation route 202, the navigation system 200 may be configured to operate in conjunction with the control system 170 and/or the perception system 180. For instance, the navigation system 200 may receive perception maps 182 that may inform decisions performed by the navigation system 200 or otherwise influence some form of mapping performed by the navigation system 200 itself. The navigation system 200 may operate in conjunction with the control system 170 such that one or more controllers 172 and/or specialty controller(s) 174, 176, 178 may control the movement of components of the robot 100 (e.g., legs 120 and/or the arm 126) to navigate along the navigation route 202.

The mission execution system 184, which is described in further detail below, may be a system of the robot 100 that is responsible for executing recorded missions. A recorded mission may, for example, specify a sequence of one or more actions that the robot 100 is to perform at respective waypoints 212 defined on a topological map 204 (shown in FIG. 2A).

As additionally shown in FIG. 1B, in some implementations, a robot controller 188 may be in wireless (or wired) communication with the robot 100 (via the network 150 or otherwise) and may allow an operator to control the robot 100. In some implementations, the robot controller 188 may be a tablet computer with "soft" UI controls for the robot 100 being presented via a touchscreen of the tablet. In other implementations, the robot controller 188 may take the form of a traditional video game controller, but possibly including a display screen, and may include a variety of physical buttons and/or soft buttons that can be depressed or otherwise manipulated to control the robot 100.

In some implementations, an operator may use the robot controller 188 to initiate a mission recording process. During such a process, the operator may direct movement of the robot 100 (e.g., via the robot controller 188) and instruct the robot 100 to take various "mission actions" (e.g., taking sensor readings, surveillance video, etc.) along the desired path of the mission. As a mission is being recorded, the robot 100 may generate a topological map 204 (shown in FIG. 2A) including waypoints 212 at various locations along its path, as well as edges 214 between such waypoints 212. In some implementations, for each mission action the operator instructs the robot to perform, a new waypoint 212 may be added to the topological map 204 that is being generated on the robot 100. Further, for each such mission action, data may be stored in the topological map 204 and/or the mission recording to associate the mission action identified in the mission recording with the waypoint 212 of the topological map 204 at which that mission action was performed. In some implementations, at the end of the mission recording process, the topological map 204 generated during mission recording may be transferred to the robot controller 188 and stored in association with the mission recording. In some implementations, other information associated with locomotion of the robot in the environment during the mission record process may also be stored. For instance, a set of footfall locations of the robot may be stored in the topological map 204 and/or the mission recording. As discussed in more detail below, the stored set of footfall locations may be used in combination with sensor data to facilitate a decision of whether to step on objects in the robot's environment during subsequent executions of the mission. Subsequent to the mission recording process, the mission recording and, if not already present on the robot 100, the associated topological map 204, may be subsequently provided to the robot 100, and the robot 100 may be instructed to execute the recorded mission (e.g., autonomously).

A detailed description of the route executor 220 of the navigation system 200 will now be provided with reference to FIGS. 2A-F. As described above, a navigation route 202 that is executed by the route executor 220 may include a sequence of instructions that cause the robot 100 to move along a path corresponding to a sequence of waypoints 212 defined on a topological map 204 (shown in FIG. 2A). As the route executor 220 guides the robot 100 through movements that follow the navigation route 202, the route executor 220 may determine whether the navigation route 202 becomes obstructed by an object. As noted above, in some implementations, the navigation route 202 may include one or more features of a topological map 204. For example, as previously described, such a topological map 204 may include waypoints 212 and edges 214 and the navigation route 202 may indicate that the robot 100 is to travel along a path that includes a particular sequence of those waypoints 212. In some implementations, the navigation route 202 may further include movement instructions that specify how the robot 100 is to move from one waypoint 212 to another. Such movement instructions may, for example, account for objects or other obstacles at the time of recording the waypoints 212 and edges 214 to the topological map 204.

Since the environment 10 may dynamically change from the time of recording the waypoints 212 to the topological map 204, the route executor 220 may be configured to determine whether the navigation route 202 becomes obstructed by an object that was not previously identified when recording the waypoints 212 on the topological map 204 being used by the navigation route 202. Such an object may be considered an "unforeseeable obstacle" in the navigation route 202 because the initial mapping process that informs the navigation route 202 did not recognize the object in the location of the obstructed object. This may occur, for example, when an object is moved or introduced to a mapped environment.

As shown in FIG. 2A, when an unforeseeable obstacle obstructs the navigation route 202, the route executor 220 may attempt to generate an alternative path 206 to another feature on the topological map 204 that avoids the unforeseeable obstacle. This alternative path 206 may deviate from the navigation route 202 temporarily, but then resume the navigation route 202 after the deviation. Unlike other approaches to generate an obstacle avoidance path, the route executor 220 seeks to only temporarily deviate from the navigation route 202 to avoid the unforeseeable obstacle such that the robot 100 may return to using course features (e.g., like topological features from the topological map 204) for the navigation route 202. In this sense, successful obstacle avoidance for the route executor 220 occurs when an obstacle avoidance path both (i) avoids the unforeseeable obstacle and (ii) enables the robot 100 to resume some portion of the navigation route 202. This technique to merge back with the navigation route 202 after obstacle avoidance may be advantageous because the navigation route 202 may be important for task or mission performance for the robot 100 (or an operator of the robot 100). For instance, an operator of the robot 100 may have tasked the robot 100 to perform an inspection task at a waypoint 212 of the navigation route 202. By generating an obstacle avoidance route that continues on the navigation route 202 after obstacle avoidance, the navigation system 200 aims to promote task or mission success for the robot 100.

To illustrate, FIG. 1A depicts the robot 100 traveling along a navigation route 202 that includes three waypoints 212a-c. While moving along a first portion of the navigation route 202 (e.g., shown as a first edge 214a) from a first waypoint 212a to a second waypoint 212b, the robot 100 encounters an unforeseeable obstacle 20 depicted as a partial pallet of boxes. This unforeseeable obstacle 20 blocks the robot 100 from completing the first portion of the navigation route 202 to the second waypoint 212b. Here, the "X" over the second waypoint 212b symbolizes that the robot 100 is unable to travel successfully to the second waypoint 212b given the pallet of boxes. As depicted, the navigation route 202 would normally have a second portion (e.g., shown as a second edge 214b) that extends from the second waypoint 212b to a third waypoint 212c. Due to the unforeseeable object 20, however, the route executor 220 generates an alternative path 206 that directs the robot 100 to move to avoid the unforeseeable obstacle 20 and to travel to the third waypoint 212c of the navigation route 202 (e.g., from a point along the first portion of the navigation route 202). In this respect, the robot 100 may not be able to navigate successfully to one or more waypoints 212, such as the second waypoint 212b, but may resume a portion of the navigation route 202 after avoiding the obstacle 20. For instance, the navigation route 202 may include additional waypoints 212 subsequent to the third waypoint 212c and the alternative path 206 may enable the robot 100 to continue to those additional waypoints 212 after the navigation system 200 directs the robot 100 to the third waypoint 212c via the alternative path 206.

As shown in FIG. 2A, and as briefly noted above, the navigation system 200 may include a navigation generator 210 that operates in conjunction with the route generator 220. The navigation generator 210 (also referred to as the generator 210) may be configured to construct a topological map 204 (e.g., during a mission recording process) as well as to generate the navigation route 202 based on the topological map 204. To generate the topological map 204, the navigation system 200 and, more particularly, the generator 210, may record sensor data corresponding to locations within an environment 10 that has been traversed or is being traversed by the robot 100 as waypoints 212. As noted above, a waypoint 212 may include a representation of what the robot 100 sensed (e.g., according to its sensor system 120) at a particular place within the environment 10. The generator 210 may generate waypoints 212, for example, based on the image data 134 collected by the sensor system 130 of the robot 100. For instance, a robot 100 may perform an initial mapping process where the robot 100 moves through the environment 10. While moving through the environment 10, systems of the robot 100, such as the sensor system 130 may gather data (e.g., sensor data 134) as a means to understand the environment 10. By obtaining an understanding of the environment 10 in this fashion, the robot 100 may later move about the environment 10 (e.g., autonomously, semi-autonomously, or with assisted operation by a user) using the information or a derivative thereof gathered from the initial mapping process.

In some implementations, the navigation generator 210 may build the topological map 204 by executing at least one waypoint heuristic (e.g., waypoint search algorithm) that triggers the navigation generator 210 to record a waypoint placement at a particular location in the topological map 204. For example, such a waypoint heuristic may be configured to detect a threshold feature detection within the image data 134 at a location of the robot 100 (e.g., when generating or updating the topological map 204). The navigation generator 210 (e.g., using a waypoint heuristic) may identify features within the environment 10 that function as reliable vision sensor features offering repeatability for the robot 100 to maneuver about the environment 10. For instance, a waypoint heuristic of the generator 210 may be pre-programmed for feature recognition (e.g., programmed with stored features) or programmed to identify features where spatial clusters of volumetric image data 134 occur (e.g., corners of rooms or edges of walls). In response to the at least one waypoint heuristic triggering the waypoint placement, the navigation generator 210 may record the waypoint 212 on the topological map 204. This waypoint identification process may be repeated by the navigation generator 210 as the robot 100 drives through an area (e.g., the robotic environment 10). For instance, an operator of the robot 100 may manually drive the robot 100 through an area for an initial mapping process that establishes the waypoints 212 for the topological map 204.

When recording each waypoint 212, the generator 210 may associate waypoint edges 214 (also referred to as edges 214) with sequential pairs of respective waypoints 212 such that the topological map 204 produced by the generator 210 includes both waypoints 212 and edges 214 between pairs of those waypoints 212. An edge 214 may indicate how one waypoint 212 (e.g., a first waypoint 212a) is related to another waypoint 212 (e.g., a second waypoint 212b). For example, an edge 214 may represent a positional relationship between a pair of adjacent waypoints 212. In other words, an edge 214 may represent a connection or designated path between two waypoints 212 (e.g., the edge 214a shown in FIG. 2A may represent a connection between the first waypoint 212a and the second waypoint 212b).

In some implementations, each edge 214 may thus represent a path (e.g., a movement path for the robot 100) between the pair of waypoints 212 it interconnects. Further, in some implementations, individual edges 214 may also reflect additional useful information. In particular, the route executor 220 of the navigation system 200 may be configured to recognize particular annotations on the edges 214 and control other systems of the robot 100 to take actions that are indicated by such annotations. For example, one or more edges 214 may be annotated to include movement instructions that inform the robot 100 how to move or navigate between waypoints 212 they interconnect. Such movement instructions may, for example, identify a pose transformation for the robot 100 before it moves along the edge 214 between two waypoints 212. A pose transformation may thus describe one or more positions and/or orientations for the robot 100 to assume to successfully navigate along the edge 214 between two waypoints 212. In some implementations, an edge 214 may be annotated to specify a full three-dimensional pose transformation (e.g., six numbers). Some of these numbers represent estimates, such as a dead reckoning pose estimation, a vision based estimation, or other estimations based on kinematics and/or inertial measurements of the robot 100.

In some implementations, one or more edges 214 may additionally or alternatively include annotations that provide further an indication/description of the environment 10. Some examples of annotations include a description or an indication that an edge 214 is associated with or located on some feature of the environment 10. For instance, an annotation for an edge 214 may specify that the edge 214 is located on stairs or passes through a doorway. Such annotations may aid the robot 100 during maneuvering, especially when visual information is missing or lacking (e.g., due to the presence of a doorway). In some configurations, edge annotations may additionally or alternatively identify one or more directional constraints (which may also be referred to as "pose constraints"). Such directional constraints may, for example, specify an alignment and/or an orientation (e.g., a pose) for the robot 100 to enable it to navigate over or through a particular environment feature. For example, such an annotation may specify a particular alignment or pose the robot 100 is to assume before traveling up or down stairs or down a narrow corridor that may restrict the robot 100 from turning.

In some implementations, sensor data 134 may be associated with individual waypoints 212 of the topological map 204. Such sensor data 134 may have been collected by the sensor system 130 of the robot 100 when the generator 210 recorded respective waypoints 212 to the topological map 204. The sensor data 134 stored for the individual waypoints 212 may enable the robot 100 to localize by comparing real-time sensor data 134 gathered as the robot 100 traverses the environment 10 according to the topological map 204 (e.g., via a route 202) with sensor data 134 stored for the waypoints 212 of the topological map 204. In some configurations, after the robot 100 moves along an edge 214 (e.g., with the goal of arriving at a target waypoint 212), the robot 100 may localize by directly comparing real-time sensor data 134 with the sensor data 134 associated with the intended target waypoint 212 of the topological map 204. In some implementations, by storing raw or near-raw sensor data 134 (i.e., with minimal processing) for the waypoints 212 of the topological map 204, the robot 100 may use real-time sensor data 134 to localize efficiently as the robot 100 maneuvers within the mapped environment 10. In some examples, an iterative closest points (ICP) algorithm may be used to localize the robot 100 with respect to a given waypoint 212.

By producing the topological map 204 using waypoints 212 and edges 214, the topological map 204 may be locally consistent (e.g., spatially consistent within an area due to neighboring waypoints), but need not be globally accurate and/or consistent. That is, as long as geometric relations (e.g., edges 214) between adjacent waypoints 212 are roughly accurate, the topological map 204 does not require precise global metric localization for the robot 100 and any sensed objects within the environment 10. As such, a navigation route 202 derived or built using the topological map 202 also does not need precise global metric information. Moreover, because the topological map 204 may be built based on waypoints 212 and relationships between waypoints (e.g., edges 214), the topological map 204 may be considered an abstraction or high-level map, as opposed to a metric map. That is, in some implementations, the topological map 204 may be devoid of other metric data about the mapped environment 10 that does not relate to waypoints 212 or their corresponding edges 214. For instance, in some implementations, the mapping process (e.g., performed by the generator 210) that creates the topological map 204 may not store or record other metric data, and/or the mapping process may remove recorded metric data to form a topological map 204 of waypoints 212 and edges 214. Either way, navigating with the topological map 204 may simplify the hardware needed for navigation and/or the computational resources used during navigation. That is, topological-based navigation may operate with low-cost vision and/or low-cost inertial measurement unit (IMU) sensors when compared to navigation using metric localization that often requires expensive LIDAR sensors and/or expensive IMU sensors. Metric-based navigation tends to demand more computational resources than topological-based navigation because metric-based navigation often performs localization at a much higher frequency than topological navigation (e.g., with waypoints 212). For instance, the common navigation approach of Simultaneous Localization and Mapping (SLAM) using a global occupancy grid is constantly performing robot localization.

Referring to FIG. 2A, the navigation generator 210 may record a plurality of waypoints 212, 212a-n on a topological map 204. From the plurality of recorded waypoints 212, the navigation generator 210 may select some number of the recorded waypoints 212 as a sequence of waypoints 212 that form the navigation route 202 for the robot 100. In some implementations, an operator of the robot 100 may use the navigation generator 210 to select or build a sequence of waypoints 212 to form the navigation route 202. In some implementations, the navigation generator 210 may generate the navigation route 202 based on receiving a destination location and a starting location for the robot 100. For instance, the navigation generator 210 may match the starting location with a nearest waypoint 212 and similarly match the destination location with a nearest waypoint 212. The navigation generator 210 may then select some number of waypoints 212 between these nearest waypoints 212 to generate the navigation route 202.

In some configurations, the navigation generator 210 may receive, e.g., as input from the mission execution system 184, a mission recording and possibly also an associated topological map 204, and, in response, may generate a navigation route 202 that includes the various waypoints 212 that are included in the mission recording, as well as intermediate waypoints 212 and edges between pairs of waypoints 212. For instance, for a mission to inspect different locations on a pipeline, the navigation generator 210 may receive a mission recording identifying waypoints 212 at which inspections are to occur as well as a topological map 204 generated during the recording process, and may generate a navigation route 202 that includes waypoints 212 that coincide with the identified inspection locations. In the example shown in FIG. 2A, the navigation generator 210 has generated the navigation route 202 with a sequence of waypoints 212 that include nine waypoints 212a-i and their corresponding edges 214a-h. FIG. 2A illustrates each waypoint 212 of the navigation route 202 in a double circle, while recorded waypoints 212 that are not part of the navigation route 202 have only a single circle. As illustrated, the navigation generator 210 may then communicate the navigation route 202 to the route executor 220.

The route executor 220 may be configured to receive and to execute the navigation route 202. To execute the navigation route 202, the route executor 220 may coordinate with other systems of the robot 100 to control the locomotion-based structures of the robot 100 (e.g., the legs) to drive the robot 100 through the sequence of waypoints 212 that are included in the navigation route 202. For instance, the route executor 220 may communicate the movement instructions associated with edges 214 connecting waypoints 212 in the sequence of waypoints 212 of the navigation route 202 to the control system 170. The control system 170 may then use such movement instructions to position the robot 100 (e.g., in an orientation) according to one or more pose transformations to successfully move the robot 100 along the edges 214 of the navigation route 202.

While the robot 100 is traveling along the navigation route 202, the route executor 220 may also determine whether the robot 100 is unable to execute a particular movement instruction for a particular edge 214. For instance, the robot 100 may be unable to execute a movement instruction for an edge 214 because the robot 100 encounters an unforeseeable obstacle 20 while moving along the edge 214 to a waypoint 212. Here, the route executor 220 may recognize that an unforeseeable obstacle 20 blocks the path of the robot 100 (e.g., using real-time or near real-time sensor data 134) and may be configured to determine whether an alternative path 206 for the robot 100 exists to an untraveled waypoint 212, 212U in the sequence of the navigation route 202. An untraveled waypoint 212U refers to a waypoint 212 of the navigation route 202 to which the robot 100 has not already successfully traveled. For instance, if the robot 100 had already traveled to three waypoints 212a-c of the nine waypoints 212a-i of the navigation route 202, the route executor 220 may try to find an alternative path 206 to one or the remaining six waypoints 212d-i, if possible. In this sense, the alternative path 206 may be an obstacle avoidance path that avoids the unforeseeable obstacle 20 and also a path that allows the robot 100 to resume the navigation route 202 (e.g., toward a particular goal or task). This means that after the robot 100 travels along the alternative path 206 to a destination of an untraveled waypoint 212U, the route executor 220 may continue executing the navigation route 202 from that destination of the alternative path 206. Such an approach may enable the robot 100 to return to navigation using the sparse topological map 204.

For example, referring to FIG. 2A, if the unforeseeable obstacle 20 blocks a portion of the third edge 214c (e.g., blocks some portion of the third edge 214c and the fourth waypoint 212d), the robot 100 has already traveled to three waypoints 212a-c. In such a circumstance, the route executor 220 may generate an alternative path 206, which avoids the unforeseeable obstacle 20, to the fifth waypoint 212e, which is an untraveled waypoint 212U. The robot 100 may then continue traversing the sequence of waypoints 212 for the navigation route 202 from the fifth waypoint 212e. This means that the robot 100 would then travel to the untraveled portion following the sequence of waypoints 212 for the navigation route 202 (e.g., by using the movement instructions of edges 214 of the untraveled portion). In the illustrated example, the robot 100 would thus travel from the fifth waypoint 212e to the sixth, seventh, eighth, and finally ninth waypoints 212, 212f-i, barring the detection of some other unforeseeable object 20. This means that, although the unforeseeable object 20 was present along the third edge 214c, the robot 100 only missed a single waypoint, i.e., the fourth waypoint 212d, during its movement path while executing the navigation route 202.

In some implementations, when the route executor 220 determines that an unforeseeable obstacle 20 blocks an edge 214, the route executor 220 may determine that the topological map 204 fails to provide an alternative route 206 avoiding the unforeseeable obstacle 20. This is usually the case because the topological map 204 includes waypoints 212 and edges 214 that were recorded during the mapping process (e.g., by the navigation generator 210). Since the unforeseeable obstacle 20 was not present at that time of mapping, the topological map 204 may fail to be able to generate an alternative path 206 on its own. In other words, the navigation generator 210 did not anticipate needing a path or edge 214 resembling the alternative path 106 in FIG. 2A, i.e., from the third waypoint 212c to the fifth waypoint 212e. This also means that the alternative path 206 is likely a path that does not correspond to an existing edge 214 in the topological map 204. Stated differently, the alternative path 206 results in a path between two waypoints 212 that were previously unconnected (e.g., by an edge 214) in the navigation route 202. In other implementations, the route executor 220 may assume that the presence of an unforeseeable obstacle 20 necessitates that the route executor 220 use other information besides the topological map 204 to generate the alternative path 206.

In some configurations, when an edge 214 is blocked by an unforeseeable object 20, the route executor 220 may resort to other maps that are available from the systems of the robot 100. In some implementations, for example, the route executor 220 may use or generate a local obstacle map 222 (shown in FIG. 2B) from current sensor data 134 captured by the sensor system 130 of the robot 100. Such a local obstacle map 222 may, for example, be a more detailed map of the environment 10 than the topological map 204, but only for a local area surrounding the robot 100 (e.g., a three meter by three meter square area). In some configurations, the local obstacle map 222 may include an occupancy grid where each cell within the grid designates whether an obstacle is present in that cell or not. The route executor 220 may then generate the alternative path 206 using the unoccupied cells of the occupancy grid in combination with the positions of the untraveled waypoints 212U. In some implementations, the local obstacle map 222 may be formed in whole or in part using one or more of the perception maps 182 from the perception system 180 (e.g., the ground height map 182a, the no step map 182b, and/or the body obstacle map 182c) for the local area surrounding the robot 100.

Figure 2B:
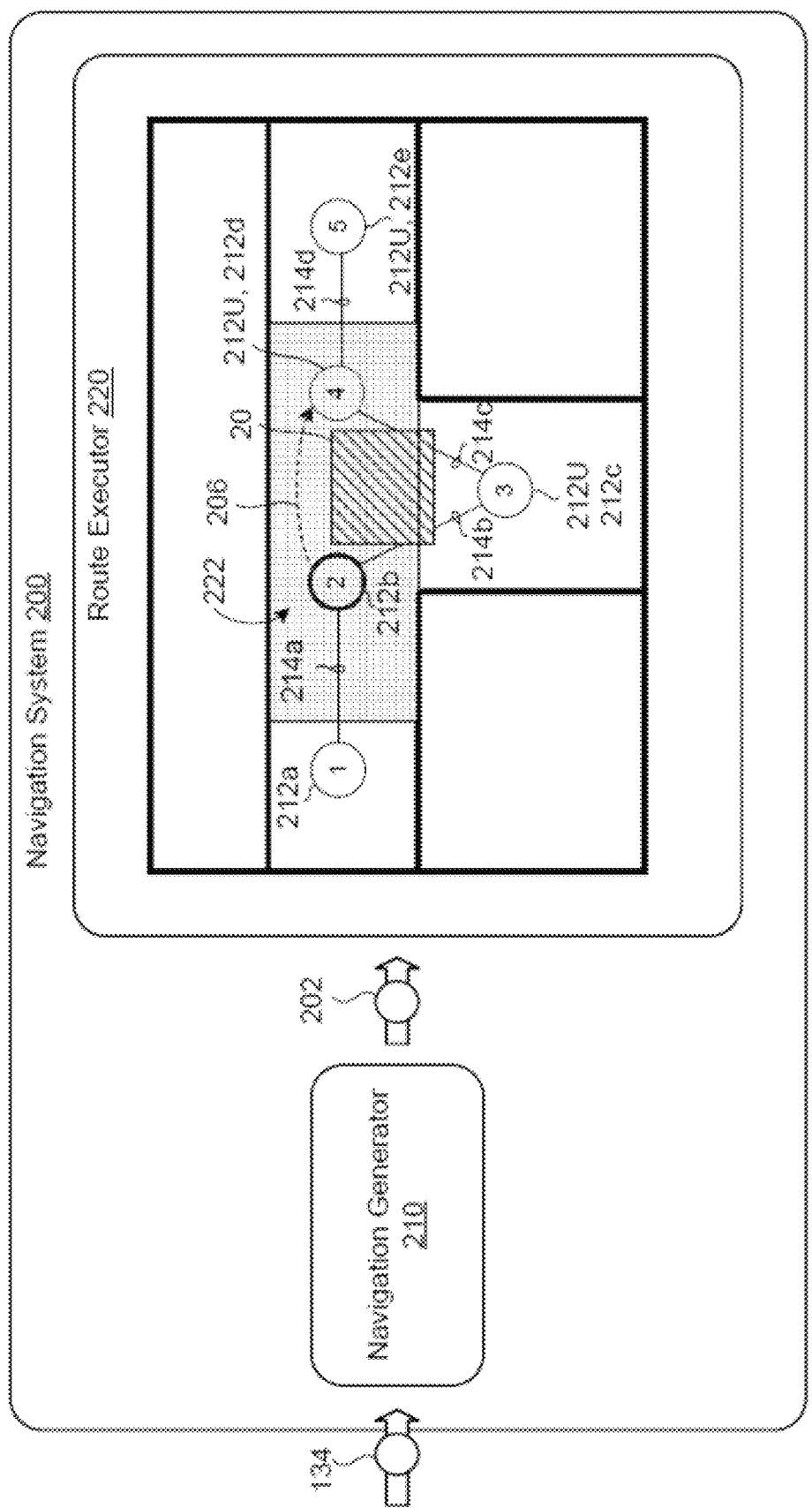
FIGS. 2B-2F illustrate example techniques for navigating a robot to avoid one or more obstacles, in accordance with some embodiments.

With the local obstacle map 222 of finite size, the route executor 220 may determine which untraveled waypoint 212U should be the destination of the alternative path 206 by determining which untraveled waypoints 212U exist within the bounds of the local obstacle map 222. As shown in FIG. 2B, the navigation route 202 may include a sequence of five waypoints 212a-e. As can be seen in that example, the robot 100 has traveled to the second waypoint 212b only to discover an unforeseeable obstacle 20 blocking a second edge 214b connecting the second waypoint 212b and a third waypoint 212c. To determine the alternative path 206 (e.g., the destination of the alternative path 206), the route executor 220 may determine which untraveled waypoints 212U exist within the bounds of the local obstacle map 222. In the example shown, the untraveled waypoints 212U include the third, fourth, and fifth waypoints 212c-e and only the fourth waypoint 212d is within the bounds of the local obstacle map 222. FIG. 2B illustrates the local obstacle map 222 as a grid. Although the third waypoint 212c and the fifth waypoint 212e are also untraveled waypoints 212U in addition to the fourth waypoint 212d, neither of those waypoints 212c,e is located within the bounds of the local obstacle map 222. As such, the local obstacle map 222 may lack sufficient information to enable the route executor 220 to generate an alternative path 206 to either of the third or fifth waypoints 212c,e. Since the fourth waypoint 212d is within the bounds of the local obstacle map 222, however, the route executor 220 may generate the alternative path 206 avoiding the obstacle 20 to the fourth waypoint 212d. The robot 100 may then proceed to follow the navigation route 202 from the fourth waypoint 212d to the fifth waypoint 212e along the fourth edge 214d.

In some examples, the route executor 220 may function methodically such that, for each untraveled waypoint 212U, the route executor 220 identifies whether a respective untraveled waypoint 212U exists within the local obstacle map 222. For instance, the route executor 220 may perform this identification for each untraveled waypoint 212U sequentially following the waypoint sequence of the navigation route 202. For the example of FIG. 2B, this would mean that the route executor 220 would first determine whether the third waypoint 212c is within the local obstacle map 222, which it is not. The route executor 220 would next determine whether the fourth waypoint 212d is within the local obstacle map 222, which it is. The route executor 220 would then determine whether the fifth waypoint 212e is within the local obstacle map 222. As shown in FIG. 2B, the fifth waypoint 212e is not within the bounds of the local obstacle map 222, but in FIG. 2C the fifth waypoint 212e is located within the bounds of the local obstacle map 222. In a situation like FIG. 2C, where more than one untraveled waypoint 212U is within the bounds of the local obstacle map 222, the route executor 220 ensure the robot 100 travels to as many of the waypoints 212 of the navigation route 202 as possible. With this criteria, the route executor 220 may generate an alternative path 206 to the fourth waypoint 212d instead of the fifth waypoint 212e to ensure that the robot 100 travels to the most possible waypoints 212 of the navigation route 202 during its movement path.

Figure 2C:
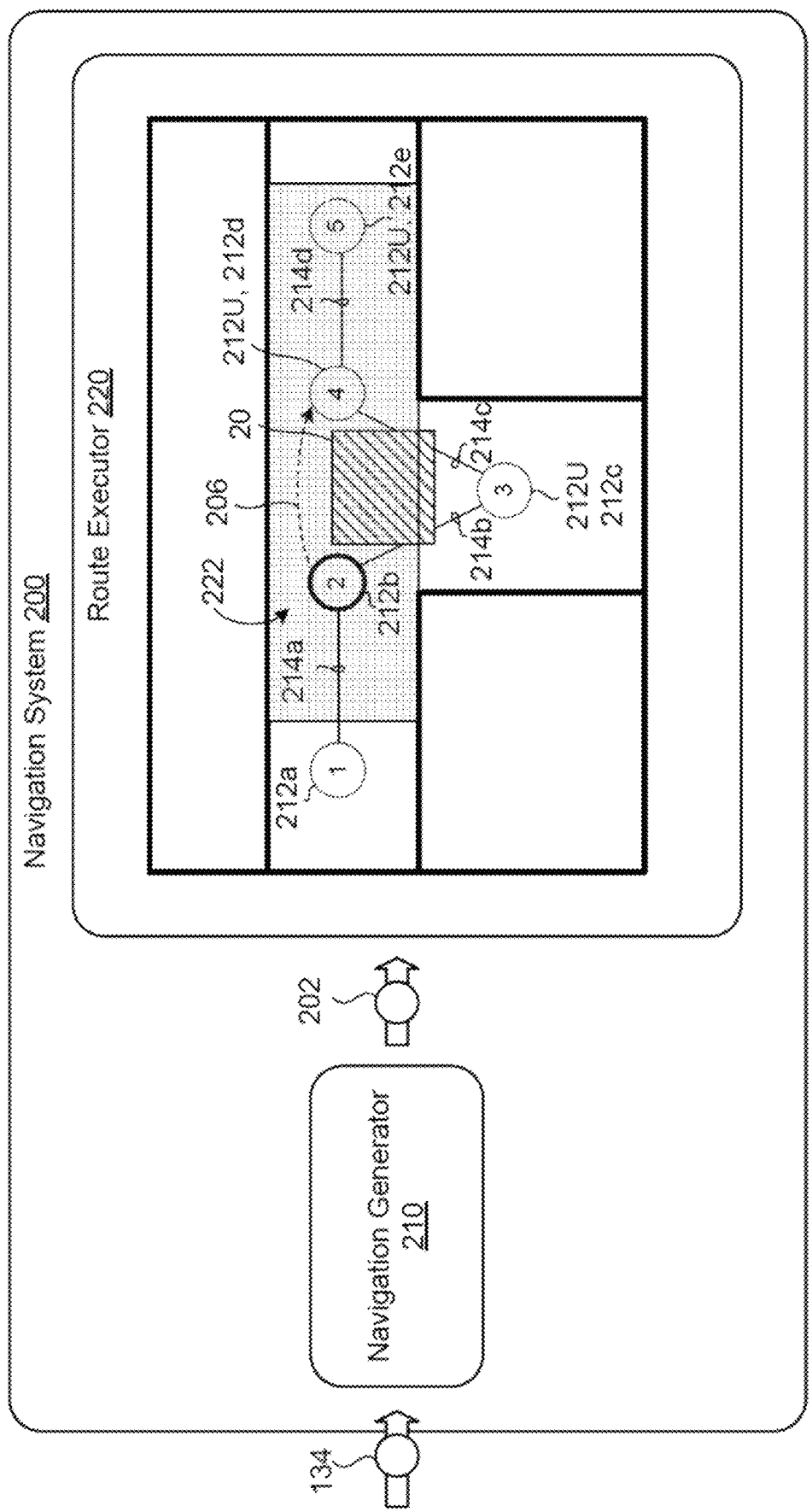
Figure 2D:
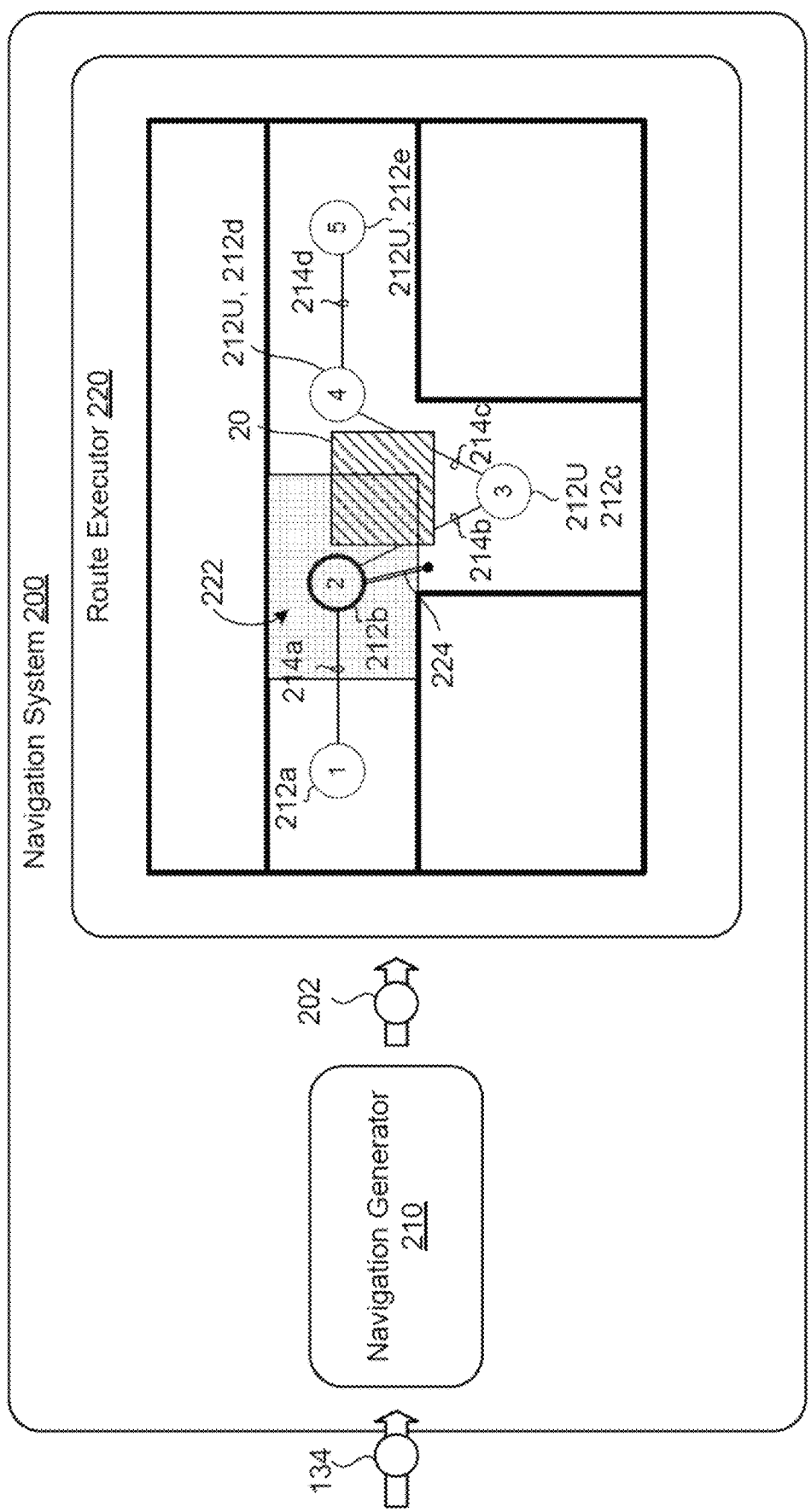
Figure 2E:
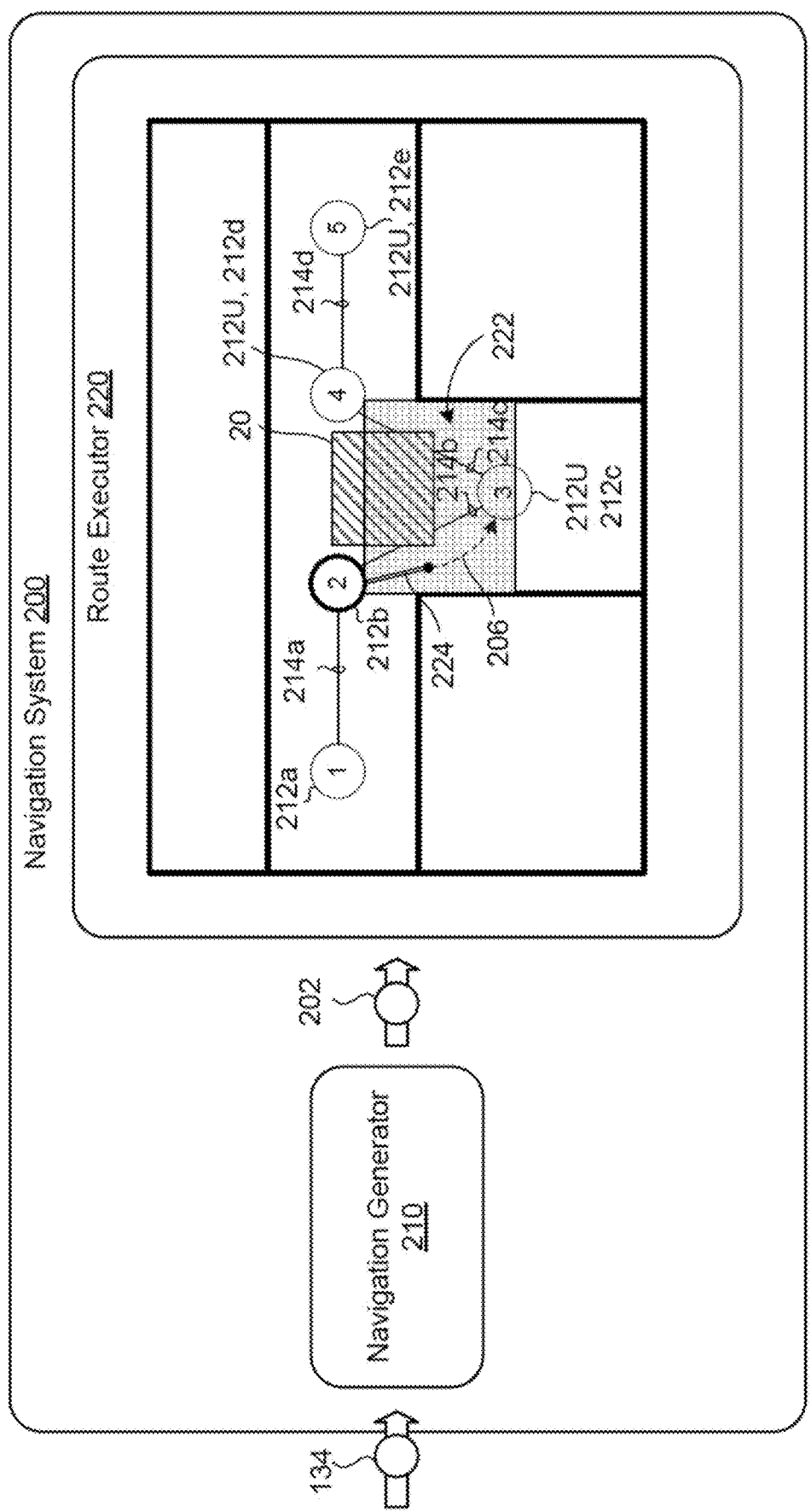

FIG. 2D illustrates a scenario that may occur where there are no untraveled waypoints 212U within the bounds of the local obstacle map 222. In this situation, the route executor 220 may be configured to generate an exploration path 224 in a direction toward the next waypoint 212 in the sequence of waypoints 212 for the navigation route 202 that avoids the unforeseeable obstacle 20. In the example of FIG. 2D, the unforeseeable obstacle 20 obstructs the second edge 214b between the second waypoint 212b and the third waypoint 212c. Because the third waypoint 212c is the next untraveled waypoint 212U in the sequence of waypoints 212 for the navigation route 202, the route executor 220 may generate an exploration path 224 where the exploration path 224 is an obstacle avoidance path towards the third waypoint 212c. As the robot 100 moves along the exploration path 224, the local obstacle map 222 may continue to span its finite area. This means that an untraveled waypoint 212U that was previously not within the bounds of the local obstacle map 222 may become within the bounds of the local obstacle map 222. In this respect, the robot 100 may explore along the exploration path 224 until an untraveled waypoint 212U is found to exist within the bounds of the local obstacle map 222. Once an untraveled waypoint 212U exists within the bounds of the local obstacle map 222, the route executor 220 may generate the alternative path 206 with a destination of the untraveled waypoint 212U, as seen in FIG. 2E. By traveling along an exploration path 224 towards the next waypoint 212 in the sequence of waypoints 212 for the navigation route 202, the route executor 220 may minimize the number of waypoints 212 that will not be traveled to by the robot 100 (or maximize the number of waypoints 212 achieved by the robot 100).

Figure 2F:
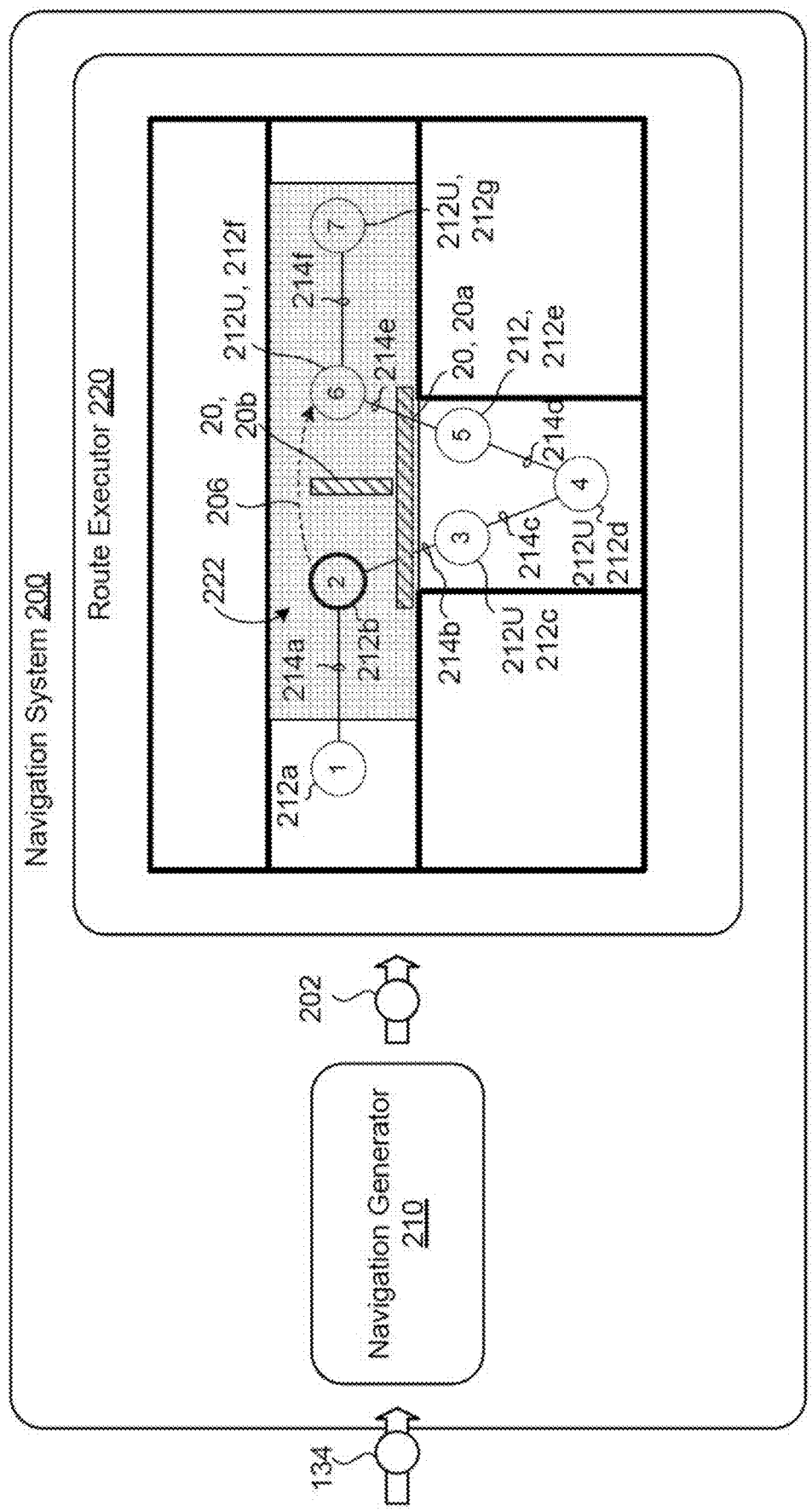

FIG. 2F is similar to FIG. 2C in that the bounds of the local obstacle map 222 include more than one untraveled waypoint 212U. However, in addition to this situation, the example of FIG. 2F also depicts how the route executor 220 may identify multiple unforeseeable obstacles 20, 20a-b. Here, a first unforeseeable obstacle 20, 20a obstructs a second edge 214b and a fifth edge 214e (e.g., completely blocking a room or a corridor). Meanwhile, a second obstacle 20, 20b does not block an edge 214, but forces the alternative path 206 to account for its presence at least partially obstructing the shortest path between the second waypoint 212b and the sixth waypoint 212f. This example also illustrates that the alternative path 206 may result in skipping multiple waypoints 212 (e.g., the third, fourth, and fifth waypoints 212U, 212c-e). Since the route executor 220 generates an alternative path 206 from the second waypoint 212b to the untraveled sixth waypoint 212U, 212f, the robot 100 may continue to travel along the navigation route 202 from the sixth waypoint 212f to the seventh waypoint 212g along the sixth edge 214f.

In the description above, during execution of a mission, the route executor 220 may recognize that obstacle 20 blocks the path of the robot 100 (e.g., using real-time or near real-time sensor data 134) and the robot 100 may be re-routed around the obstacle 20 to continue along the route specified by the mission recording. Obstacle 20 may be a relatively large object (e.g., greater than 30 cm in height) that the robot may not be able to traverse over (e.g., step on) thereby blocking progress of the robot along the route specified in the mission recording. In some embodiments, the objects detected as obstacles 20 may be on the order of the height of the body of the robot.

The inventors have recognized and appreciated that in addition to larger obstacles, there may be one or more smaller objects in the environment (e.g., less than 30 cm in height) that do not necessarily block progress of the robot 100 along the route in the mission recording (e.g., because robot 100 may be capable of traversing rough terrain and/or may be otherwise able to step over some objects in its path), but nonetheless may be objects for which it would be desirable for the robot 100 to navigate around (e.g., using one or more of the re-routing techniques described herein), even though the robot 100 is capable of stepping on such objects. Non-limiting examples of such objects include, but are not limited to, pallets, hard hats, buckets, staged construction material, and forklift tines. Such objects can be tripping hazards to the robot, potentially preventing the robot from completing its mission. Some objects in the environment may be fragile equipment that may be damaged if stepped on by a robot. The inventors have recognized that in many environments it is not practical or easy to keep the path of the robot clear of objects all of the time, especially when the robot is navigating autonomously to execute a previously-recorded mission. To this end, some embodiments of the present disclosure describe techniques for distinguishing between objects that a robot is allowed to step on (e.g., stairs, over pipes) in the environment and objects that the robot should not step on, but should instead be routed around.

Figure 3:
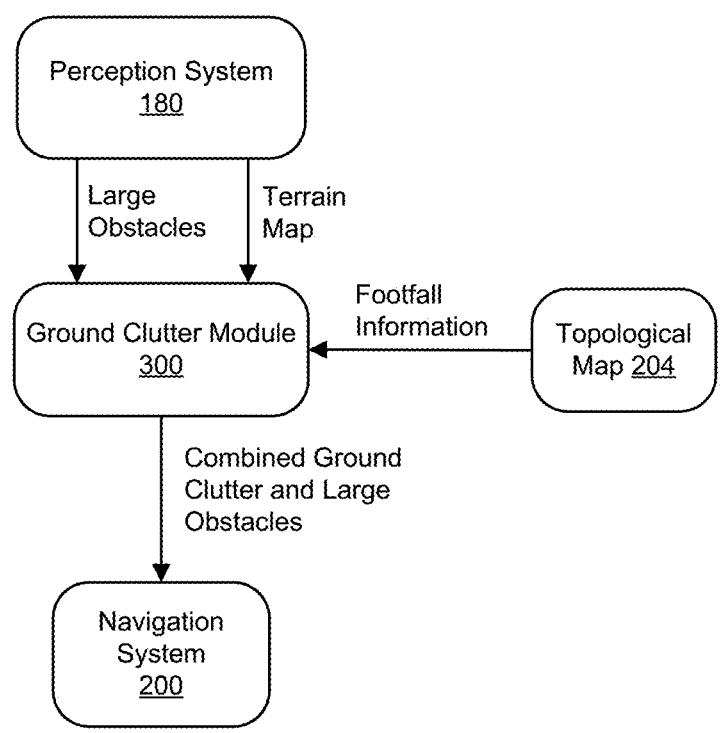
FIG. 3 is a block diagram of a system for detecting ground clutter obstacles in an environment of a robot, in accordance with some embodiments.

As shown in FIG. 3, some embodiments of the present disclosure include a ground clutter module 300 that uses information from the perception system 180 (e.g., one or more perception maps generated based on sensor data received from sensor system 130) and stored data indicating a set of footfall locations of the robot from a previous execution of the mission (e.g., when the mission was recorded) to identify objects in the environment capable of being stepped on by robot 100, but which should be treated as obstacles for which the robot should be re-routed around. As described in more detail below, ground clutter module 300 produces a map of "ground clutter" obstacles in a local area surrounding the robot 100. One or more perception maps of the terrain surrounding the robot (e.g., ground height map 182a) may be used together with information about where the robot stepped during a previous execution of the mission (e.g., during mission recording) to identify ground clutter obstacles that should be added to the set of obstacles (together with the larger objects blocking the path of the robot) for which the robot should be re-routed during execution of the mission.

Figure 4:
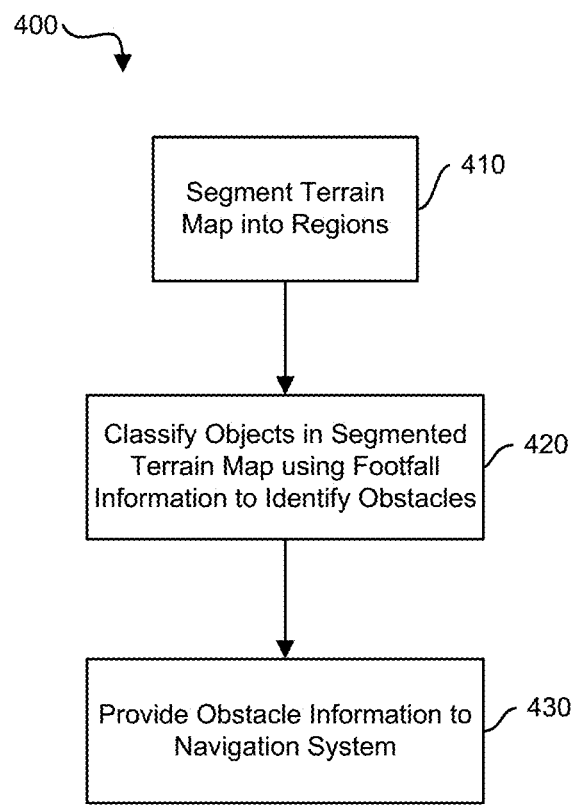
FIG. 4 is a flowchart of a process for identifying ground cluster obstacles during execution of a mission based on sensor data and stored data indicating footfall locations of a robot during a previous execution of a mission, in accordance with some embodiments.
Figure 5:
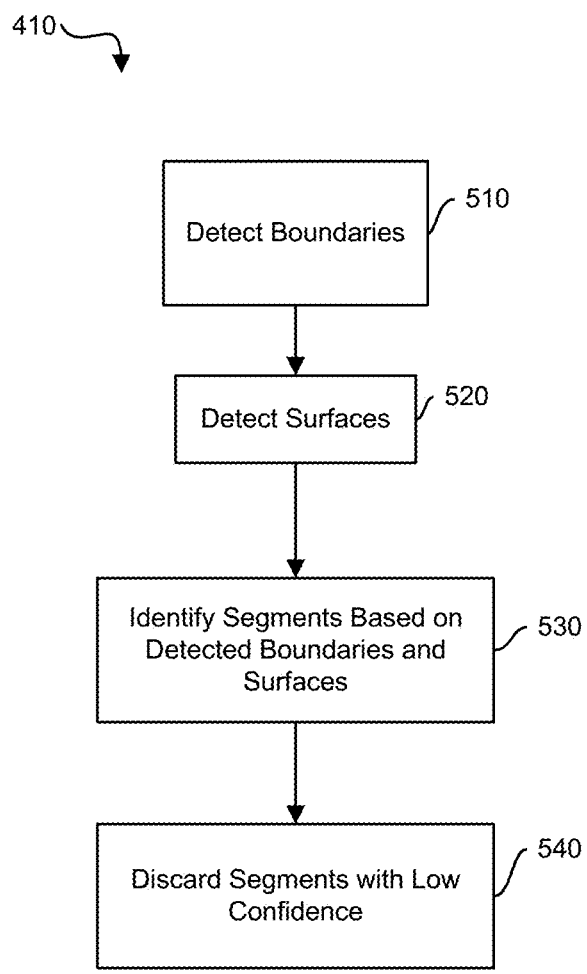
FIG. 5 is a flowchart of a process for segmenting a terrain map to detect potential ground clutter obstacles in an environment, in accordance with some embodiments.
Figure 6:
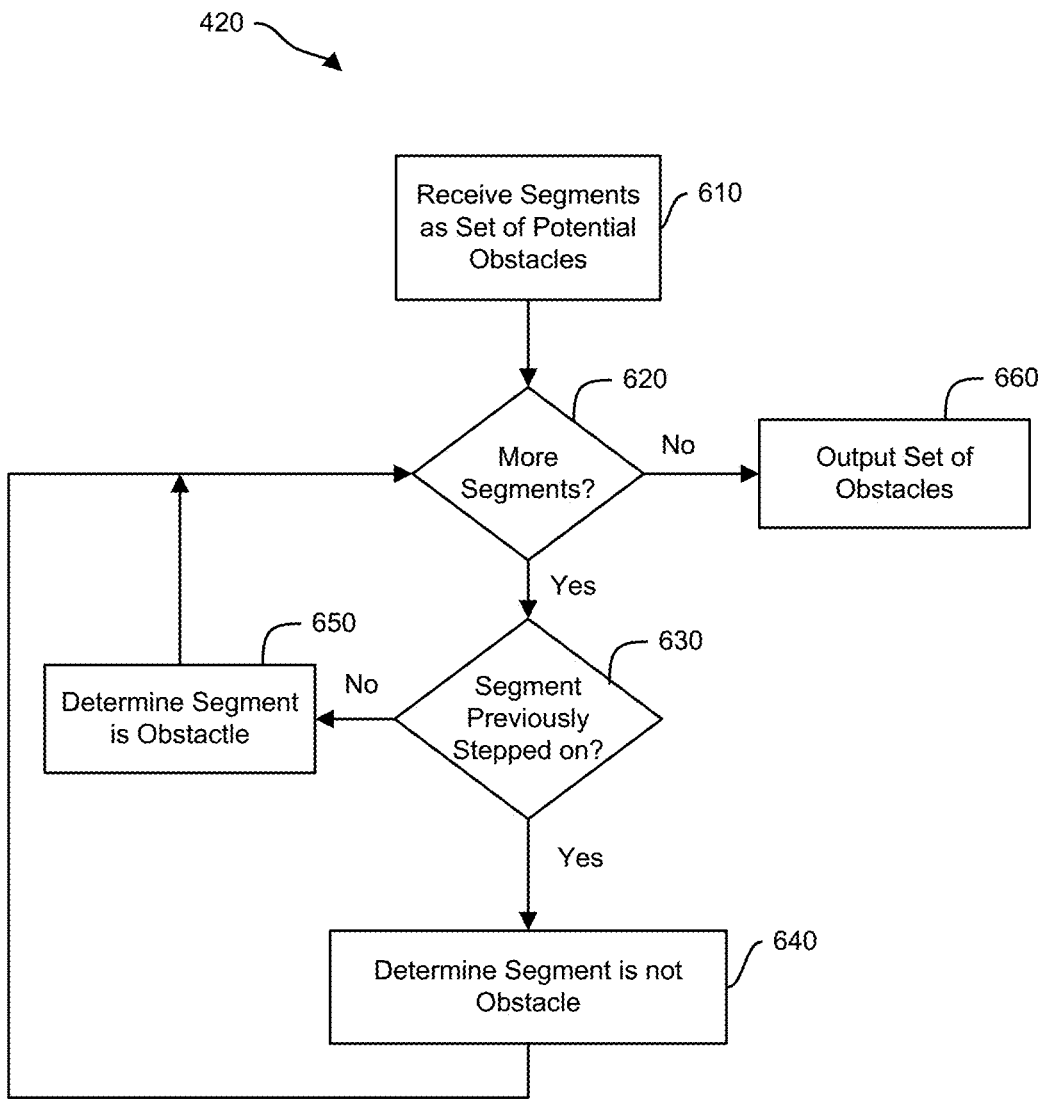
FIG. 6 is a flowchart of a process for classifying potential ground clutter obstacles as obstacles based on footfall information, in accordance with some embodiments.

FIG. 4 illustrates a process 400 for identifying ground clutter obstacles during execution of a mission, in accordance with some embodiments. In some embodiments, process 400 is implemented by ground clutter module 300 shown in FIG. 3. In act 410, a perception map of the environment of a robot 100 (also referred to herein as a "terrain map") is received from perception module 180, and is segmented into regions to identify a set of potential ground clutter obstacles in the local environment of the robot. The terrain map received from the perception module 180 may include one or more of the perception maps 182 described herein (e.g., ground height map 182a) or other suitable perception maps that may be used to characterize features of the environment. FIG. 5, described in more detail below, illustrates one implementation for performing segmentation of a terrain map in accordance with some embodiments. Process 400 then proceeds to act 420, where the segments of the terrain map associated with potential ground clutter obstacles identified in act 410 are classified based, at least in part, on stored data indicating footfall locations of a robot recorded during at least one previous execution of the mission by the robot (e.g., during recording of the mission). FIG. 6, described in more detail below, illustrates one implementation for performing classification of identified segments, in accordance with some embodiments. For instance, during segment classification, it may be assumed that if the robot stepped on an object (e.g., stairs) during a previous execution of the mission (e.g., when an operator was controlling the robot to record the mission), that it should be acceptable to step on that same object during a current execution of the mission.

One or more ground clutter obstacles identified in act 420 may be combined with any larger obstacles identified by perception system 180 as obstacle information of the local environment of the robot. For instance, the obstacle information may be represented in an obstacle map, which is provided in act 430 of process 400 to navigation system 200. Navigation system 200 may then re-route the robot around the obstacles identified in the obstacle information, for example, using one or more of the obstacle avoidance techniques described above in connection with FIGS. 2B-2F.

Figure 7:
FIG. 7 schematically illustrates the detection of boundaries in a terrain map as a portion of a segmentation process, in accordance with some embodiments.

FIG. 5 illustrates one implementation of process 410 for segmenting a terrain map of a local environment of the robot to identify segments of the terrain map that include potential ground clutter obstacles, in accordance with some embodiments. In act 510, the terrain map is processed to detect boundaries between separate objects in the map. For instance, the terrain map may include information about the height of objects in the environment of the robot, and a boundary may be detected in the terrain map as a local change in height that exceeds a threshold value. In some embodiments, the threshold value is in the range 3-10 cm. In some embodiments, the threshold value is in the range 4-8 cm. In some embodiments, the threshold value is 6 cm. The inventors have recognized that a terrain map may include incomplete information describing the environment of the robot. To at least partially account for such incomplete information, in some embodiments, connected components identified as portions of boundaries in the terrain map may be used to detect boundaries in act 510. FIG. 7 illustrates a portion of a terrain map from which different boundaries have been detected. For instance, boundaries associated with a first object 710 located on the ground in front of the robot and boundaries associated with a second object 720 located on the ground next to the robot have been detected in the terrain map of FIG. 7.

Figure 8:
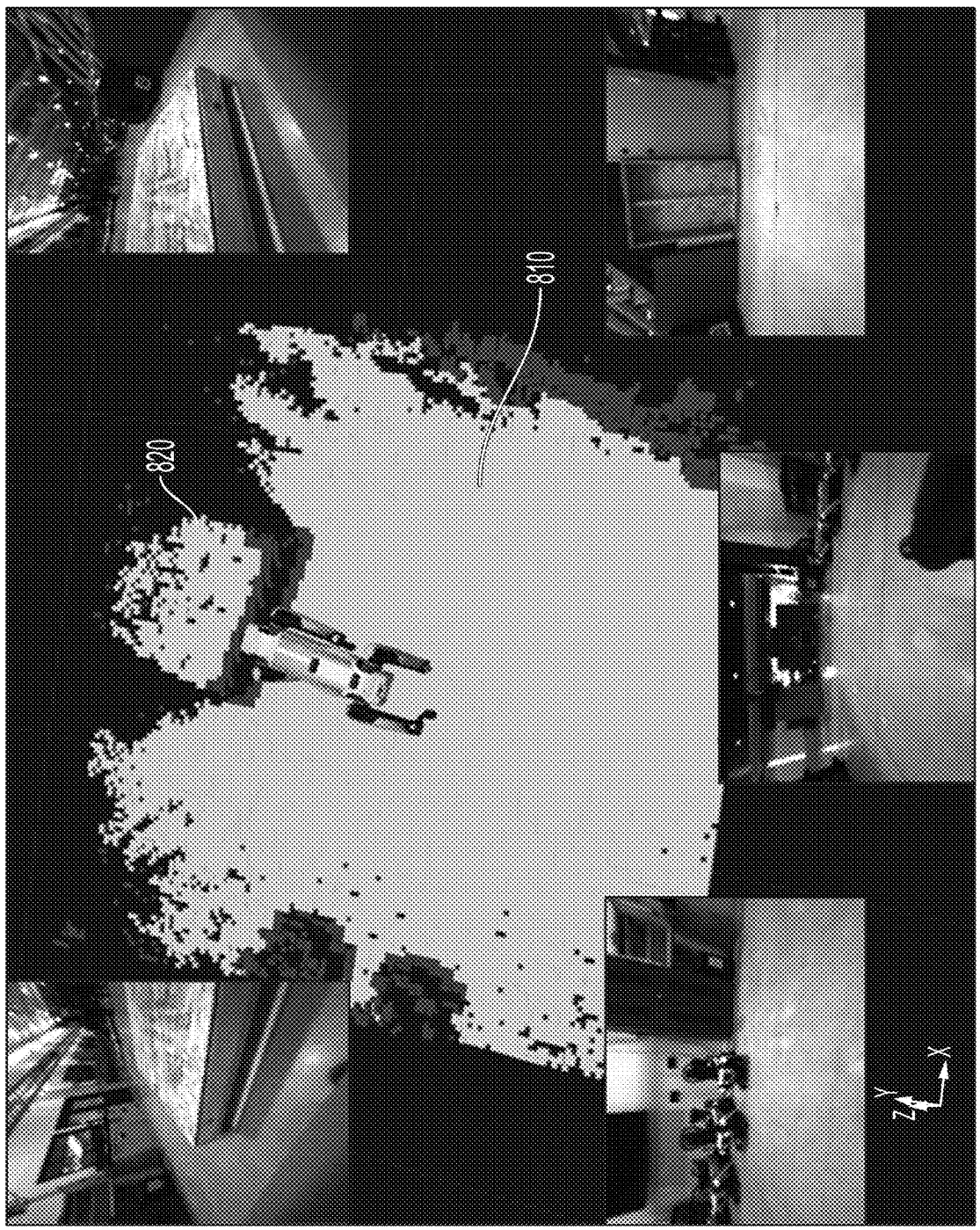
FIG. 8 schematically illustrates the detection of surfaces in a terrain map as a portion of a segmentation process, in accordance with some embodiments.

Process 410 then proceeds to act 520, where one or more surfaces in the terrain map are detected. For instance, the floor on which the robot is travelling may be a first detected surface, the top of a pallet in the environment may be a second detected surface, and the top of a box resting on the floor may be a third detected surface. In some embodiments, connected components identified as portions of surfaces in the terrain map may be used to detect boundaries in act 510 to at least partially account for incomplete information in the terrain map. FIG. 8 illustrates a portion of a terrain map from which surfaces have been detected. For instance, a ground surface 810 and a pallet top surface 820 have been detected in the terrain map of FIG. 8.

Although acts 510 and 520 are shown as being performed serially, it should be appreciated that acts 510 and 520 may be performed entirely or partially in parallel and in any order. For instance, a set of surfaces (e.g., including a floor/ground surface and one or more surfaces higher than the ground surface) in the terrain may be detected as well as boundaries connecting the surfaces.

Process 410 then proceeds to act 530, where a set of segments of the terrain map that include potential ground clutter obstacles is identified based on the detected boundaries and surfaces. Connected components between the detected boundaries and the detected surfaces may be identified separately, to account for the fact that, in some instances, only the boundary between two objects may be observable (e.g., when the top surface of an object is occluded or unclear), whereas in other instances, only surfaces, but not the boundary between then may be observable (e.g., when there is an unobserved region between the two surfaces due, for example, to occlusion). In some embodiments, segments separated by a small distance of occlusion may be combined. For instance, segments separated by a distance of 3-10 cm, a distance of 4-8 cm, or a distance of 6 cm may be combined, in some embodiments. Process 410 then proceeds to act 540, where segments with low confidence (e.g., segments that are too small and/or do not have much of an observed boundary) may be discarded from the set of segments. For instance, segments less than 500 cm 2, segments less than 300 cm 2 or segments less than 200 cm 2 may be discarded from the set of segments, in some embodiments. Additionally, segments with an observable boundary less than 40 cm, less than 30 cm, or less than 20 cm may be discarded from the set of segments, in some embodiments. It should be appreciated that additional and/or alternate factors may also be used to determine whether a segment has low confidence and should be discarded. For instance, some objects in the environment that move around (e.g., people or other robots) may be modeled, and segments corresponding to such objects may be determined to have low confidence and may be discarded. Each of the segments in the set of segments may then be classified based, at least in part, on stored footfall information to identify one or more ground clutter obstacles, as described with reference to FIG. 6.

Figure 9:
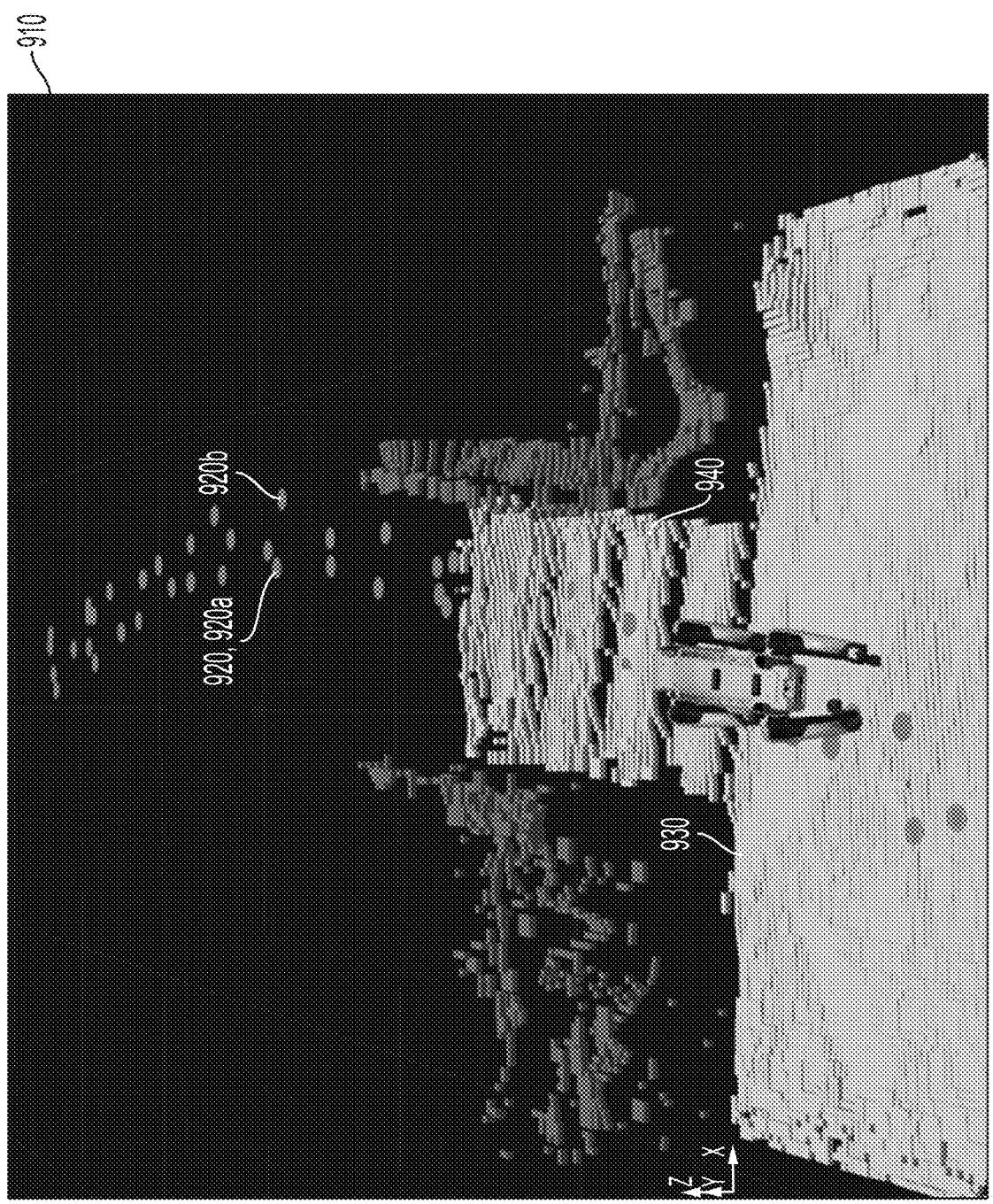
FIG. 9 schematically illustrates an overlay of footfall information on a segmented terrain map for identifying ground clutter obstacles, in accordance with some embodiments.

FIG. 6 illustrates one implementation of process 420 for classifying segments as ground cluster obstacles, in accordance with some embodiments. In act 610, a set of segments detected from a terrain map, as described above with reference to FIG. 5, are provided as input to the classification process 420. In some embodiments, the set of segments may be represented as a segmented map (e.g., a segmented version of a terrain map). Each of the segments in the set represents a potential ground clutter obstacle in a set of potential ground clutter obstacles and is classified based, at least in part, on stored data indicating footfall locations of the robot during one or more previous executions of a mission, as described further below. Process 420 then proceeds to act 620, where it is determined whether there are more segments in the set to classify. If it is determined that there are more segments to classify, the process 420 proceeds to act 630 where it is determined based, at least in part, on stored data indicating footfall locations of the robot during a previous execution of the mission, whether the robot previously stepped on a location in the environment corresponding where the segment is located. FIG. 9 illustrates an example of a segmented map 910 that includes an overlay of a set of footfall locations 920 indicating where the robot stepped during a previous execution of the mission (e.g., during mission recording). As can be observed in the segmented map 910, several surfaces including a ground surface 930 and a stair surface 940 have been identified. In one implementation, each pair of upcoming footfalls 920a, 920b (also referred to as a "stance" of the robot) yet to be traversed by the robot along the route in the mission recording is compared to the segmented map to determine whether the segment was previously stepped on by the robot during a previous execution of the mission (e.g., during mission recording).

In some embodiments, the comparison between the stances of the robot based on the upcoming footfall information and the segmented terrain map checks for a large difference in height (e.g., a distance too large to be a position error of the footfall information and/or the segment location). In some embodiments, the comparison between the stances of the robot based on the upcoming footfall information and the segmented terrain map checks for a large difference in the change in height (e.g. a new step up that was previously flat terrain). In either case (i.e., when a large difference in height is detected or a large difference in a change in height is detected), it may be determined that the potential ground clutter obstacle was not present during the previous execution of the mission, and as such, necessarily was not stepped on by the robot during the previous execution of the mission. In some embodiments, the change in height may be an absolute difference (e.g., 20 cm, 30 cm, 40 cm) between the upcoming footfall information and the segmented terrain map. In other embodiments, the change in height may be a relative change in height between pairs of steps represented in the upcoming footfall information and the segmented terrain map. For instance, the estimated z-position of the robot may drift as it walks (e.g., based on the footfall information stored at record time, the robot may think it walked down a very gradual slope, and the segmented terrain map may indicate that the environment has a very gradual up-slope. In such a case, there may be a relatively large height discrepancy between the footfall information and the segmented terrain map, which may not be indicative of an obstacle. However if, based on the footfall information stored at record time, the robot thinks it stepped up 6 cm, but the segmented terrain map shows relatively flat terrain, it may be indicative of an obstacle moved since record time (e.g., in this case, an object was removed from the path.

In some embodiments, stored data other than footfall information may be used in addition to the footfall information to classify potential ground clutter obstacles. For instance, one or more perception maps of the environment recorded during a previous execution of the mission (e.g., during recording of the mission) may be used to classify one or more of the potential ground clutter obstacles as obstacles.

If it is determined in act 630 that the segment was stepped on by the robot during a previous execution of the mission, process 420 proceeds to act 640, where it is determined that the segment is not a ground clutter obstacle. In this way, potential obstacles in the environment that have been stepped on by the robot during a previous execution of a mission (e.g., stepped on by the robot during mission recording when an operator was navigating the robot) can be ruled out as obstacles that should cause the robot to be re-routed. Use of stored data indicating footfall locations of the robot during a previous execution of the mission for ground clutter obstacle classification simplifies the classification to a binary problem, by not requiring an identification of the object to be classified (e.g., whether it is a box, a pallet, or an expensive delicate tool). Rather it is assumed that it is acceptable for the robot to step on objects in the environment that were stepped on by the robot during a previous execution of the mission as it proceeds along the route during a current execution of the mission. Process 420 then returns to act 620, where it is determined whether there are more segments to classify.

If it is determined in act 630 that the segment was not stepped on during a previous execution of the mission, process 420 proceeds to act 650, where it is determined that the segment is a ground clutter obstacle that should not be stepped on by the robot during the current execution of the mission. In such an instance, the potential ground clutter obstacle corresponding to the segment is classified as a ground clutter obstacle. Process 420 then returns to act 620, where it is determined whether there are more segments to classify. The classification process in acts 620-650 repeats until it is determined that there are no more segments to classify, after which the set of ground clutter obstacles is output to the navigation system, in act 660, as described above. For instance, the set of ground clutter obstacles may be combined with a set of larger obstacles within a local obstacle map, such that the robot can be re-routed around the obstacles in the local obstacle map rather than stepping on them, as described above.

Figure 10:
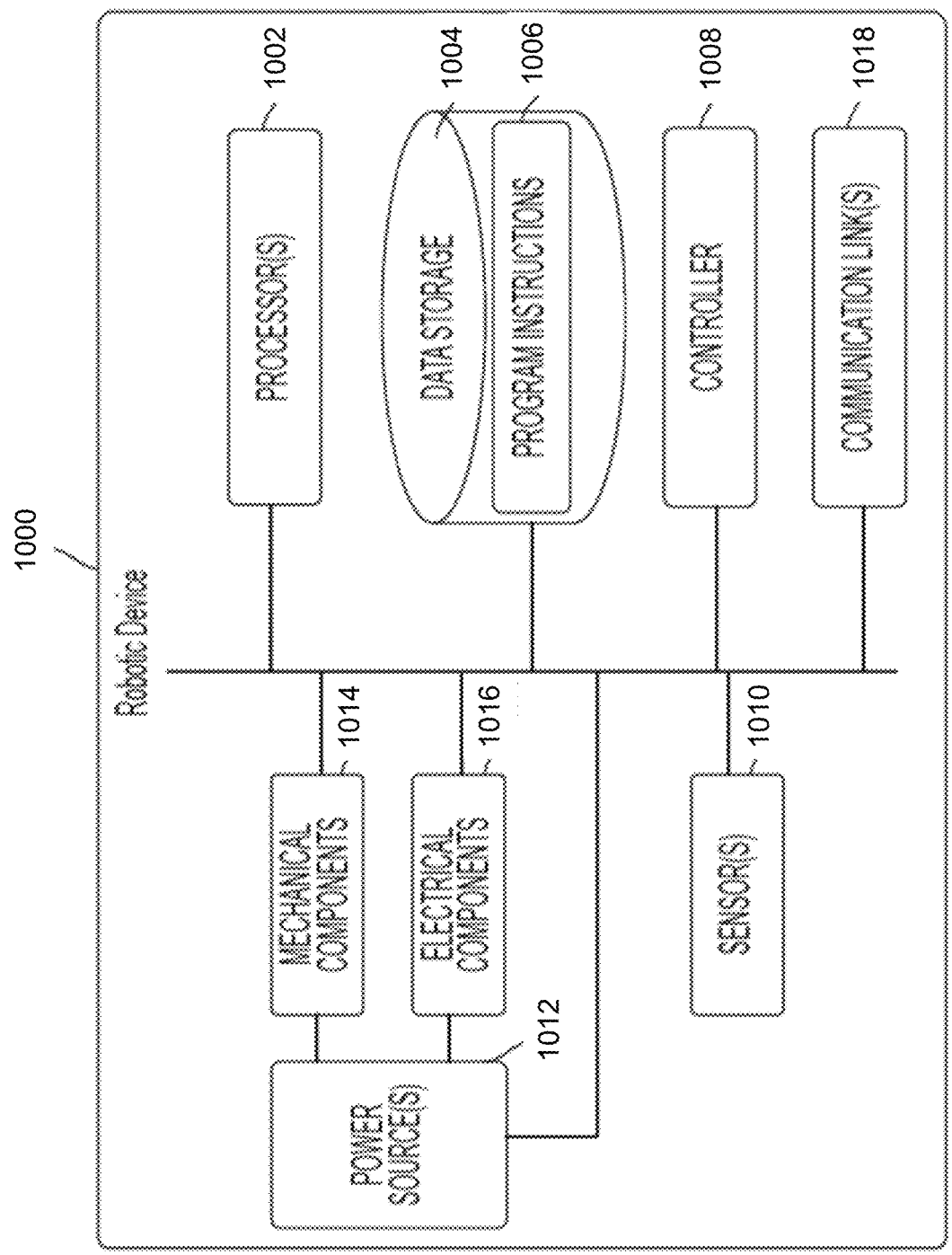
FIG. 10 is a block diagram of components of a robot on which some embodiments may be implemented.

FIG. 10 illustrates an example configuration of a robotic device (or "robot") 1000, according to some embodiments. The robotic device 1000 may, for example, correspond to the robot 100 described above. The robotic device 1000 represents an illustrative robotic device configured to perform any of the techniques described herein. The robotic device 1000 may be configured to operate autonomously, semi-autonomously, and/or using directions provided by user(s), and may exist in various forms, such as a humanoid robot, biped, quadruped, or other mobile robot, among other examples. Furthermore, the robotic device 1000 may also be referred to as a robotic system, mobile robot, or robot, among other designations.

As shown in FIG. 10, the robotic device 1000 may include processor(s) 1002, data storage 1004, program instructions 1006, controller 1008, sensor(s) 1010, power source(s) 1012, mechanical components 1014, and electrical components 1016. The robotic device 1000 is shown for illustration purposes and may include more or fewer components without departing from the scope of the disclosure herein. The various components of robotic device 1000 may be connected in any manner, including via electronic communication means, e.g., wired or wireless connections. Further, in some examples, components of the robotic device 1000 may be positioned on multiple distinct physical entities rather on a single physical entity.

The processor(s) 1002 may operate as one or more general-purpose processor or special purpose processors (e.g., digital signal processors, application specific integrated circuits, etc.). The processor(s) 1002 may, for example, correspond to the data processing hardware 142 of the robot 100 described above. The processor(s) 1002 can be configured to execute computer-readable program instructions 1006 that are stored in the data storage 1004 and are executable to provide the operations of the robotic device 1000 described herein. For instance, the program instructions 1006 may be executable to provide operations of controller 1008, where the controller 1008 may be configured to cause activation and/or deactivation of the mechanical components 1014 and the electrical components 1016. The processor(s) 1002 may operate and enable the robotic device 1000 to perform various functions, including the functions described herein.

The data storage 1004 may exist as various types of storage media, such as a memory. The data storage 1004 may, for example, correspond to the memory hardware 144 of the robot 100 described above. The data storage 1004 may include or take the form of one or more non-transitory computer-readable storage media that can be read or accessed by processor(s) 1002. The one or more computer-readable storage media can include volatile and/or non-volatile storage components, such as optical, magnetic, organic or other memory or disc storage, which can be integrated in whole or in part with processor(s) 1002. In some implementations, the data storage 1004 can be implemented using a single physical device (e.g., one optical, magnetic, organic or other memory or disc storage unit), while in other implementations, the data storage 1004 can be implemented using two or more physical devices, which may communicate electronically (e.g., via wired or wireless communication). Further, in addition to the computer-readable program instructions 1006, the data storage 1004 may include additional data such as diagnostic data, among other possibilities.

The robotic device 1000 may include at least one controller 1008, which may interface with the robotic device 1000 and may be either integral with the robotic device, or separate from the robotic device 1000. The controller 1008 may serve as a link between portions of the robotic device 1000, such as a link between mechanical components 1014 and/or electrical components 1016. In some instances, the controller 1008 may serve as an interface between the robotic device 1000 and another computing device. Furthermore, the controller 1008 may serve as an interface between the robotic system 1000 and a user(s). The controller 1008 may include various components for communicating with the robotic device 1000, including one or more joysticks or buttons, among other features. The controller 1008 may perform other operations for the robotic device 1000 as well. Other examples of controllers may exist as well.

Additionally, the robotic device 1000 may include one or more sensor(s) 1010 such as image sensors, force sensors, proximity sensors, motion sensors, load sensors, position sensors, touch sensors, depth sensors, ultrasonic range sensors, and/or infrared sensors, or combinations thereof, among other possibilities. The sensor(s) 1010 may, for example, correspond to the sensors 132 of the robot 100 described above. The sensor(s) 1010 may provide sensor data to the processor(s) 1002 to allow for appropriate interaction of the robotic system 1000 with the environment as well as monitoring of operation of the systems of the robotic device 1000. The sensor data may be used in evaluation of various factors for activation and deactivation of mechanical components 1014 and electrical components 1016 by controller 1008 and/or a computing system of the robotic device 1000.

The sensor(s) 1010 may provide information indicative of the environment of the robotic device for the controller 1008 and/or computing system to use to determine operations for the robotic device 1000. For example, the sensor(s) 1010 may capture data corresponding to the terrain of the environment or location of nearby objects, which may assist with environment recognition and navigation, etc. In an example configuration, the robotic device 1000 may include a sensor system that may include a camera, RADAR, LIDAR, time-of-flight camera, global positioning system (GPS) transceiver, and/or other sensors for capturing information of the environment of the robotic device 1000. The sensor(s) 1010 may monitor the environment in real-time and detect obstacles, elements of the terrain, weather conditions, temperature, and/or other parameters of the environment for the robotic device 1000.

Further, the robotic device 1000 may include other sensor(s) 1010 configured to receive information indicative of the state of the robotic device 1000, including sensor(s) 1010 that may monitor the state of the various components of the robotic device 1000. The sensor(s) 1010 may measure activity of systems of the robotic device 1000 and receive information based on the operation of the various features of the robotic device 1000, such as the operation of extendable legs, arms, or other mechanical and/or electrical features of the robotic device 1000. The sensor data provided by the sensors may enable the computing system of the robotic device 1000 to determine errors in operation as well as monitor overall functioning of components of the robotic device 1000.

For example, the computing system may use sensor data to determine the stability of the robotic device 1000 during operations as well as measurements related to power levels, communication activities, components that require repair, among other information. As an example configuration, the robotic device 1000 may include gyroscope(s), accelerometer(s), and/or other possible sensors to provide sensor data relating to the state of operation of the robotic device. Further, sensor(s) 1010 may also monitor the current state of a function, such as a gait, that the robotic system 1000 may currently be operating. Additionally, the sensor(s) 1010 may measure a distance between a given robotic leg of a robotic device and a center of mass of the robotic device. Other example uses for the sensor(s) 1010 may exist as well.

Additionally, the robotic device 1000 may also include one or more power source(s) 1012 configured to supply power to various components of the robotic device 1000. Among possible power systems, the robotic device 1000 may include a hydraulic system, electrical system, batteries, and/or other types of power systems. As an example illustration, the robotic device 1000 may include one or more batteries configured to provide power to components via a wired and/or wireless connection. Within examples, components of the mechanical components 1014 and electrical components 1016 may each connect to a different power source or may be powered by the same power source. Components of the robotic system 1000 may connect to multiple power sources as well.

Within example configurations, any suitable type of power source may be used to power the robotic device 1000, such as a gasoline and/or electric engine. Further, the power source(s) 1012 may charge using various types of charging, such as wired connections to an outside power source, wireless charging, combustion, or other examples. Other configurations may also be possible. Additionally, the robotic device 1000 may include a hydraulic system configured to provide power to the mechanical components 1014 using fluid power. Components of the robotic device 1000 may operate based on hydraulic fluid being transmitted throughout the hydraulic system to various hydraulic motors and hydraulic cylinders, for example. The hydraulic system of the robotic device 1000 may transfer a large amount of power through small tubes, flexible hoses, or other links between components of the robotic device 1000. Other power sources may be included within the robotic device 1000.

Mechanical components 1014 can represent hardware of the robotic system 1000 that may enable the robotic device 1000 to operate and perform physical functions. As a few examples, the robotic device 1000 may include actuator(s), extendable leg(s) ("legs"), arm(s), wheel(s), one or multiple structured bodies for housing the computing system or other components, and/or other mechanical components. The mechanical components 1014 may depend on the design of the robotic device 1000 and may also be based on the functions and/or tasks the robotic device 1000 may be configured to perform. As such, depending on the operation and functions of the robotic device 1000, different mechanical components 1014 may be available for the robotic device 1000 to utilize. In some examples, the robotic device 1000 may be configured to add and/or remove mechanical components 1014, which may involve assistance from a user and/or other robotic device. For example, the robotic device 1000 may be initially configured with four legs, but may be altered by a user or the robotic device 1000 to remove two of the four legs to operate as a biped. Other examples of mechanical components 1014 may be included.

The electrical components 1016 may include various components capable of processing, transferring, providing electrical charge or electric signals, for example. Among possible examples, the electrical components 1016 may include electrical wires, circuitry, and/or wireless communication transmitters and receivers to enable operations of the robotic device 1000. The electrical components 1016 may interwork with the mechanical components 1014 to enable the robotic device 1000 to perform various operations. The electrical components 1016 may be configured to provide power from the power source(s) 1012 to the various mechanical components 1014, for example. Further, the robotic device 1000 may include electric motors. Other examples of electrical components 1016 may exist as well.

In some implementations, the robotic device 1000 may also include communication link(s) 1018 configured to send and/or receive information. The communication link(s) 1018 may transmit data indicating the state of the various components of the robotic device 1000. For example, information read in by sensor(s) 1010 may be transmitted via the communication link(s) 1018 to a separate device. Other diagnostic information indicating the integrity or health of the power source(s) 1012, mechanical components 1014, electrical components 1018, processor(s) 1002, data storage 1004, and/or controller 1008 may be transmitted via the communication link(s) 1018 to an external communication device.

In some implementations, the robotic device 1000 may receive information at the communication link(s) 1018 that is processed by the processor(s) 1002. The received information may indicate data that is accessible by the processor(s) 1002 during execution of the program instructions 1006, for example. Further, the received information may change aspects of the controller 1008 that may affect the behavior of the mechanical components 1014 or the electrical components 1016. In some cases, the received information indicates a query requesting a particular piece of information (e.g., the operational state of one or more of the components of the robotic device 1000), and the processor(s) 1002 may subsequently transmit that particular piece of information back out the communication link(s) 1018.

In some cases, the communication link(s) 1018 include a wired connection. The robotic device 1000 may include one or more ports to interface the communication link(s) 1018 to an external device. The communication link(s) 1018 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-described functions. The one or more controllers can be implemented in numerous ways, such as with dedicated hardware or with one or more processors programmed using microcode or software to perform the functions recited above.

Various aspects of the present technology may be used alone, in combination, or in a variety of arrangements not specifically described in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, some embodiments may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments in detail, various modifications and improvements will readily occur to those skilled in the art. Such modifications and improvements are intended to be within the spirit and scope of the technology. Accordingly, the foregoing description is by way of example only, and is not intended as limiting.

What is claimed is:

1. A method of navigating a robot along a route through an environment, the route being associated with a mission, the method comprising:
   identifying, based on sensor data received by one or more sensors of the robot, a set of potential obstacles in the environment;
   determining, based at least in part on stored data indicating a set of footfall locations of the robot during a previous execution of the mission, that at least one of the potential obstacles in the set is an obstacle;
   wherein determining, based at least in part on the stored data indicating the set of footfall locations of the robot during the previous execution of the mission, that at least one of the potential obstacles in the set is an obstacle comprises, for each of the potential obstacles in the set comprises:
   determining, based on the set of footfall locations, whether the robot stepped on the potential obstacle during the previous execution of the mission; and
   determining that the potential obstacle is an obstacle when it is determined that the robot did not step on the potential obstacle during the previous execution of the mission; and
   navigating the robot to avoid stepping on the obstacle.

2. The method of claim 1, wherein the sensor data comprises image data.

3. The method of claim 1, wherein the sensor data comprises point cloud data representing distances to objects in the environment.

4. The method of claim 1, further comprising:
   processing the sensor data to generate a terrain map of the environment,
   wherein identifying the set of potential obstacles in the environment is based, at least in part, on the terrain map.

5. The method of claim 4, further comprising:
   segmenting the terrain map to generate a segmented map,
   wherein identifying the set of potential obstacles in the environment is based, at least in part, on the segmented map.

6. The method of claim 5, wherein segmenting the terrain map comprises:
   detecting at least one boundary in the terrain map; and
   detecting at least one surface in the terrain map,
   wherein identifying the set of potential obstacles in the environment is based, at least in part, on the at least one boundary and the at least one surface.

7. The method of claim 6, wherein identifying the set of potential obstacles in the environment is based, at least in part, on the detected at least one boundary and the detected at least one surface comprises:
   identifying a set of segments in the segmented map that include at least one boundary connected to at least one detected surface; and
   including in the set of potential obstacles, objects associated with at least some of the segments in the set of segments.

8. The method of claim 7, further comprising:
   discarding, from the set of segments, segments having a size below a threshold size; and including in the set of potential obstacles, objects associated with segments having a size above the threshold size.

9. The method of claim 1, wherein
the set of footfall locations comprises upcoming footfall locations along a portion of the route that the robot has not yet traversed, and
determining, based on the set of footfall locations, whether the robot stepped on the potential obstacle during the previous execution of the mission comprises determining whether the robot stepped on the potential obstacle based on one or more of the upcoming footfall locations along the route that the robot has not yet traversed.

10. The method of claim 1, further comprising:
identifying, based on the sensor data, a set of one or more large obstacles in the environment of the robot;
adding the obstacle to the set of one or more large obstacles; and
navigating the robot to avoid stepping on all of the obstacles in the set of one or more large obstacles.

11. The method of claim 1, wherein a height of the obstacle is less than 30 cm.

12. The method of claim 1, where the previous execution of the mission corresponds to an execution of the mission when the mission was recorded during operation of the robot by an operator.

13. A legged robot, comprising:
a perception system including one or more sensors configured to sense sensor data;
at least one computer processor configured to:
identify, based on the sensor data, a set of potential obstacles in an environment;
and determine, based at least in part on stored data indicating a set of footfall locations of the legged robot during a previous execution of a mission, that at least one of the potential obstacles in the set is an obstacle;
wherein determining, based at least in part on the stored data indicating the set of footfall locations of the robot during the previous execution of the mission, that at least one of the potential obstacles in the set is an obstacle comprises, for each of the potential obstacles in the set comprises:
determining, based on the set of footfall locations, whether the legged robot stepped on the potential obstacle during the previous execution of the mission; and
determining that the potential obstacle is an obstacle when it is determined that the legged robot did not step on the potential obstacle during the previous execution of the mission; and
a navigation system configured to navigate the legged robot to avoid stepping on the obstacle.

14. The legged robot of claim 13, wherein the sensor data comprises image data.

15. The legged robot of claim 13, wherein the sensor data comprises point cloud data representing distances to objects in the environment.

16. The legged robot of claim 13, wherein the at least one computer processor is further configured to:
process the sensor data to generate a terrain map of the environment,
wherein identifying the set of potential obstacles in the environment is based, at least in part, on the terrain map.

17. The legged robot of claim 16, wherein the at least one computer processor is further configured to:
segment the terrain map to generate a segmented map,
wherein identifying the set of potential obstacles in the environment is based, at least in part, on the segmented map.

18. The legged robot of claim 17, wherein segmenting the terrain map comprises:
detecting at least one boundary in the terrain map; and
detecting at least one surface in the terrain map,
wherein identifying the set of potential obstacles in the environment is based, at least in part, on the at least one boundary and the at least one surface.

19. The legged robot of claim 18, wherein identifying the set of potential obstacles in the environment is based, at least in part, on the detected at least one boundary and the detected at least one surface comprises:
identifying a set of segments in the segmented map that include at least one boundary connected to at least one detected surface; and
including in the set of potential obstacles, objects associated with at least some of the segments in the set of segments.

20. The legged robot of claim 19, wherein the at least one computer processor is further configured to:
discard, from the set of segments, segments having a size below a threshold size; and
include in the set of potential obstacles, objects associated with segments having a size above the threshold size.

21. The legged robot of claim 13, wherein
the set of footfall locations comprises upcoming footfall locations along a portion of a route that the legged robot has not yet traversed, and
determining, based on the set of footfall locations, whether the legged robot stepped on the potential obstacle during the previous execution of the mission comprises determining whether the legged robot stepped on the potential obstacle based on one or more of the upcoming footfall locations along the route that the legged robot has not yet traversed.

22. The legged robot of claim 13, wherein the at least one computer processor is further programmed to:
identify, based on the sensor data, a set of one or more large obstacles in the environment of the legged robot;
add the obstacle to the set of one or more large obstacles; and
navigate the legged robot to avoid stepping on all of the obstacles in the set of one or more large obstacles.

23. The legged robot of claim 13, wherein a height of the obstacle is less than 30 cm.

24. The legged robot of claim 13, where the previous execution of the mission corresponds to an execution of the mission when the mission was recorded during operation of the legged robot by an operator.

25. A non-transitory computer readable medium encoded with a plurality of instructions that, when executed by at least one computer processor perform a method of navigating a robot along a route through an environment, the route being associated with a mission, the method comprising:
identifying, based on sensor data received by one or more sensors of the robot, a set of potential obstacles in the environment;
determining, based at least in part on stored data indicating a set of footfall locations of the robot during a previous execution of the mission, that at least one of the potential obstacles in the set is an obstacle;
wherein determining, based at least in part on the stored data indicating the set of footfall locations of the robot during the previous execution of the mission, that at least one of the potential obstacles in the set is an obstacle comprises, for each of the potential obstacles in the set comprises:

determining, based on the set of footfall locations, whether the robot stepped on the potential obstacle during the previous execution of the mission; and determining that the potential obstacle is an obstacle when it is determined that the robot did not step on the potential obstacle during the previous execution of the mission; and navigating the robot to avoid stepping on the obstacle.

* * * * *